(12) United States Patent
Xiang et al.

(10) Patent No.: US 10,710,744 B2
(45) Date of Patent: Jul. 14, 2020

(54) LEVELING MECHANISM FOR PASSENGER BOARDING BRIDGE, AND PASSENGER BOARDING BRIDGE

(71) Applicants: China International Marine Containers (Group) Ltd., CIMC R&D CENTER, Shenzen, Guangdong (CN); Shenzhen Cimc-Tianda Airport Support Ltd., Shenzen, Guangdong (CN)

(72) Inventors: Wei Xiang, Shenzhen (CN); Lei Shi, Shenzhen (CN); Zhisheng Li, Shenzhen (CN)

(73) Assignees: CHINA INTERNATIONAL MARINE CONTAINERS (GROUP) LTD., Shenzhen (CN); SHENZHEN CIMC-TIANDA AIRPORT SUPPORT LTD., Shenzhen (CN)

( * ) Notice: Subject to any disclaimer, the term of this patent is extended or adjusted under 35 U.S.C. 154(b) by 0 days.

(21) Appl. No.: 16/265,568

(22) Filed: Feb. 1, 2019

(65) Prior Publication Data
US 2019/0193870 A1    Jun. 27, 2019

Related U.S. Application Data

(63) Continuation of application No. PCT/CN2016/093554, filed on Aug. 5, 2016.

(51) Int. Cl.
*E01D 15/00* (2006.01)
*B64F 1/305* (2006.01)

(52) U.S. Cl.
CPC ............ *B64F 1/305* (2013.01); *E01D 15/005* (2013.01)

(58) Field of Classification Search
CPC ............................... B64F 1/305; E01D 15/005
(Continued)

(56) References Cited

U.S. PATENT DOCUMENTS

| 3,543,318 A * | 12/1970 | Tushim | B64F 1/305 |
| | | | 14/71.5 |
| 6,757,926 B2 * | 7/2004 | Konya | B64F 1/3055 |
| | | | 14/71.5 |

(Continued)

FOREIGN PATENT DOCUMENTS

| CN | 2749788 Y | 1/2006 |
| CN | 102001450 A | 4/2011 |

(Continued)

OTHER PUBLICATIONS

Translation of Written Opinion dated Mar. 23, 2017 in International Application No. PCT/CN2016/093554.

*Primary Examiner* — Raymond W Addie
(74) *Attorney, Agent, or Firm* — Mei & Mark LLP

(57) ABSTRACT

A passenger boarding bridge leveling mechanism mounted on a passenger boarding bridge includes a four-bar linkage mechanism and a preload apparatus. The four-bar linkage mechanism includes a mounting base which can be fixedly mounted on the passenger boarding bridge. One of the other three bars of the four-bar linkage mechanism extends outwards, and a leveling wheel and a first detection switch are mounted on the end of the bar. The first detection switch is used for detecting the vertical displacement of the leveling wheel on an aircraft fuselage. The preload apparatus has a preload force. One end of the preload apparatus is connected to the four-bar linkage mechanism, and the other end is connected to the mounting base. The preload apparatus has a preload force to make the leveling wheel maintain a tendency of extending outwards. The passenger boarding (Continued)

bridge leveling mechanism has high test precision and can work reliably.

26 Claims, 16 Drawing Sheets

(58) Field of Classification Search
USPC .......................................................... 14/71.5
See application file for complete search history.

(56) References Cited

U.S. PATENT DOCUMENTS

| | | | |
|---|---|---|---|
| 7,120,959 B2* | 10/2006 | Hutton | ..................... B64F 1/305 |
| | | | 14/71.5 |
| 7,564,367 B2* | 7/2009 | Nelson | ............... A61B 18/1492 |
| | | | 340/686.6 |
| 10,519,614 B2* | 12/2019 | Glatfelter | .............. B64F 1/3055 |

FOREIGN PATENT DOCUMENTS

| | | |
|---|---|---|
| FR | 2573723 A1 | 5/1986 |
| JP | H01262297 A | 10/1989 |
| WO | PCT/CN2016/093554 | 3/2017 |
| WO | WO2018023712 | 2/2018 |

\* cited by examiner

LEVELING MECHANISM FOR PASSENGER BOARDING BRIDGE, AND PASSENGER BOARDING BRIDGE

CROSS-REFERENCE

The present disclosure is a continuation of International Application No. PCT/CN2016/093554, filed on Aug. 5, 2016, and titled "PASSENGER BOARDING BRIDGE LEVELING MECHANISM AND PASSENGER BOARDING BRIDGE", the entire subject matter and contents thereof are incorporated herein by reference.

TECHNICAL FIELD

The present disclosure relates generally to a leveling mechanism and, in particular, to a passenger boarding bridge leveling mechanism.

BACKGROUND

Referring to FIG. 1, there is shown a schematic view of a conventional passenger boarding bridge leveling mechanism. As shown in FIG. 1, the conventional passenger boarding bridge leveling mechanism 10 includes a drive device 11, a swing bar 12, a driving bar 13, a first detection switch 14, and a leveling wheel 15. The drive device 11 is mounted on a passenger boarding bridge 100 (see FIG. 2), one end of the swing bar 12 is hinged to the drive device 11, the other end of the swing bar 12 is hinged to one end of the driving bar 13, and the other end of the driving bar 13 mounts the first detection switch 14 and the leveling wheel 15. The first detection switch 14 may be, for example, a limit switch or an encoder, and the leveling wheel 15 may be a rubber wheel.

When the passenger boarding bridge 100 docks with an aircraft, the drive device 11 drives the swing bar 12 to drive the driving bar 13 to move the leveling wheel 15 in order to contact and maintain a certain pressure to press on an aircraft fuselage. When a passenger gets on/off the aircraft or loads/unloads the cargo, a body of the aircraft will ascend or descend. Due to a pressure between the leveling wheel 15 and the aircraft fuselage, the leveling wheel 15 will roll on the aircraft fuselage during the ascent or descent of the aircraft fuselage, and because the leveling wheel 15 is connected to the first detection switch 14, the first detection switch 14 may detect a signal of the leveling wheel 15 rotated relative to the driving bar 13, and provide the detected signal to a PLC, and the PLC calculates a distance of the ascent or descent of the aircraft fuselage according to the received signal. A front end of the passenger boarding bridge 100 is controlled to ascend or descend following the aircraft fuselage so that the passenger boarding bridge always maintains a suitable height position to dock with the aircraft fuselage.

Referring to FIG. 2, there is shown a comparison schematic diagram between the initial position of the passenger boarding bridge docking with the aircraft and the position of the passenger boarding bridge after it has ascended. As shown in FIG. 2, a rear end of the passenger boarding bridge 100 is hinged to a fixed building such as an airport terminal 200, and the passenger boarding bridge 100 may be extended back and forth, so that its front end can dock with the aircraft fuselage. As described above, the front end of the PLC controlled passenger boarding bridge 100 ascends or descends as the aircraft fuselage ascends or descends. However, the current structure of the passenger boarding bridge 100 determines that the front end of the passenger boarding bridge 100 will simultaneously be extended back and forth as it ascends or descends. As shown in FIG. 2, after the front end of the passenger boarding bridge 100 ascends, the passenger boarding bridge 100 moves a displacement $\Delta L$ in a horizontal direction compared with the initial position. Once the front end of the passenger boarding bridge 100 generates a horizontal displacement in the horizontal direction, a hinge point between the driving bar 13 and the swing bar 12 of the leveling mechanism will also move forward and backward, and the leveling wheel 15 of the leveling mechanism remains to be pressed against the aircraft fuselage. Thus, the forward and backward movement of the hinge point between the driving bar 13 and the swing bar 12 will make the leveling wheel 15 roll vertically on the aircraft fuselage, while the vertical rolling of the leveling wheel 15 means that the leveling wheel 15 is rotated relative to the driving bar 13. This relative rotation is detected by a detecting device mounted on the driving bar 13, thereby leading to a situation that the PLC misjudges the vertical motion of the aircraft fuselage and a detection error occurs.

Referring to FIG. 3, there is shown a schematic view of a detection error due to an angular change of the driving bar in the leveling mechanism. As shown in FIG. 3, the front end of the passenger boarding bridge 100 extends a displacement G in a horizontal direction, and in this process, one end of the driving bar 13 is changed from an initial position (see the solid line) to a position away from the aircraft (see the broken line) so as to generate an angular change $\alpha$, and the other end of the driving bar 13 moves a displacement H in a vertical direction, which corresponds to a certain distance that the leveling wheel 15 vertically moves along the aircraft fuselage. Therefore, as a back and forth extension of the front end of the passenger boarding bridge 100 in the horizontal direction changes, the hinge point of the lower end of the driving bar 13 is brought to move back and forth, and the angle of the driving bar 13 relative to the leveling wheel 15 also changes accordingly, which change is detected by the detecting device mounted on the driving bar 13, thereby leading to a situation that the PLC misjudges that the aircraft fuselage moves vertically and a detection error occurs.

Referring to FIG. 4, there is shown a detection error curve of a conventional passenger boarding bridge leveling mechanism. It can be seen from FIG. 4 that, as a retraction distance of the front end of the passenger boarding bridge 100 increases (further and further away from the aircraft), the detection error curve caused by a change of the horizontal distance tends to rapidly rise, which means that the detection error caused by the change of the horizontal distance rapidly increases as the retraction distance of the front end of the passenger boarding bridge 100 increases; and simultaneously, as shown in FIG. 4, the detection error curve caused by the angular change of the driving bar 13 also presents an upwards tendency as the retraction distance of the front end of the passenger boarding bridge 100 increases, i.e., the detection error caused by the angular change of the driving bar 13 also gradually increases as the retraction distance of the front end of the passenger boarding bridge 100 increases, since a total detection error is a sum of the detection error caused by the change of horizontal distance and the detection error caused by the angular change, the total detection error rapidly increases as the retraction distance of the front end of the passenger boarding bridge 100 increases. Therefore, a passenger boarding bridge leveling mechanism currently causes a larger detection error with respect to the mechanical principle, thereby jeopardizing safety of the aircraft.

It can be determined according to the above analysis that, if the leveling wheel 15 of a passenger boarding bridge leveling mechanism may also move linearly as the passenger boarding bridge extends back and forth, the detection error may be avoided. Generally, a mechanism for realizing back and forth linear extension movement of the leveling wheel 15 needs to utilize a guide rail, a slider or a roller, however, in an actual use, because the aircraft fuselage represents a certain curvature, the mechanism with the linear extension movement has an upward or downward component force when the aircraft ascends or descends, which force tends to jam the linear extension movement or deform the guide rail, so that the mechanism is unreliable.

The above information disclosed in this background section is only intended to enhance understanding of the background of the present disclosure, and thus may include information that does not constitute the prior art known by those ordinary skilled in the art.

SUMMARY

According to one aspect of the present disclosure, a passenger boarding bridge leveling mechanism is mounted on a passenger boarding bridge. The passenger boarding bridge leveling mechanism includes a four-bar linkage mechanism, a preload apparatus and a drive device. The four-bar linkage mechanism includes a mounting base and three bars, and the mounting base may be fixedly mounted on the passenger boarding bridge; one of three bars extends outwards, and a leveling wheel and a first detection switch are mounted at an end of the outwardly extending bar, the first detection switch is used for detecting a vertical displacement of the leveling wheel on an aircraft fuselage; an end of the preload apparatus is connected to the mounting base, and the other end thereof is connected to one of three bars, the preload apparatus further includes a preload force to make the outwardly extending bar maintain a tendency of extending outwards.

According to an embodiment of the present disclosure, three bars of the four-bar linkage mechanism include a driving bar, a driven bar and a mounting bar, a lower portion of the driving bar is hinged to the mounting base; a lower end of the driven bar is hinged to the mounting base and the driven bar is located above the driving bar; one end of the mounting bar is hinged to an upper end of the driven bar, the other end thereof extends outwards and is mounted with a leveling wheel and a first detection switch; an upper end of the driving bar is hinged to the mounting bar.

According to an embodiment of the present disclosure, wherein the preload apparatus is a tension spring, one end of a tension spring is connected to a lower end of the driving bar, and the other end thereof is connected to the mounting base.

According to an embodiment of the present disclosure, a hinge position of the upper end of the driving bar and the mounting bar is adjacent to a hinge point of the mounting bar and the driven bar.

According to an embodiment of the present disclosure, a side surface of the driving bar facing the mounting bar is an inclined surface, and the inclined surface is capable of being attached to the mounting bar in a state in which the passenger boarding bridge leveling mechanism is retracted.

According to an embodiment of the present disclosure, a length ratio of the driving bar, the driven bar and the mounting bar is (1.1~1.3):(0.9~1.1):(1.1~1.3).

According to an embodiment of the present disclosure, the driving bar and/or the driven bar and/or the mounting bar are hollow and tubular.

According to an embodiment of the present disclosure, the passenger boarding bridge leveling mechanism further includes a drive device mounted on the mounting base for driving the mounting bar to extend outwards or retract.

According to an embodiment of the present disclosure, the mounting base has an inclined plate portion, a hollow portion and an opening, and the driven bar and the driving bar are respectively hinged to upper and lower ends of the inclined plate portion.

According to an embodiment of the present disclosure, the lower end of the driving bar extends into a hollow portion from an opening of the mounting base, and the drive device is mounted on the hollow portion and may drive the lower portion of the driving bar to rotate the driving bar about the hinge point where the driving bar and the mounting base are hinged.

According to an embodiment of the present disclosure, the passenger boarding bridge leveling mechanism further includes a drawbar, one end of which is connected to the lower portion of the driving bar and the other end of which is connected to the drive device.

According to an embodiment of the present disclosure, the passenger boarding bridge leveling mechanism further includes a housing assembly in which the passenger boarding bridge leveling mechanism may be accommodated when the passenger boarding bridge leveling mechanism is in the retracted condition.

According to an embodiment of the present disclosure, the housing assembly includes a fixed housing body, a left opening door and a right opening door, the fixed housing body is fixed to the mounting base and has an accommodation space and an opening; and a side of the left opening door is hinged to a side of the opening of the fixed housing body; a side of the right opening door is hinged to the other side of the opening of the fixed housing body, and the left and right opening doors may close the opening in a closed state.

According to an embodiment of the present disclosure, the housing assembly further includes at least two torsion springs, at least two limiting members and a door opening mechanism, and at least two torsion springs are respectively disposed at a connection between the left and right opening doors and the fixed housing body, a torsion force of the torsion spring makes the left opening door and the right opening door maintain a tendency of opening; at least two limiting members are respectively used to limit a maximum angle at which the left opening door and the right opening door may be opened; the door opening mechanism is used for automatically opening or closing the left and right opening doors.

According to an embodiment of the present disclosure, the door opening mechanism includes a limiting bar and two limiting plates, the limiting bar is fixed to the mounting bar, and both ends of the limiting bar extend out of the mounting bar; two limiting plates are respectively fixed at inside of the left opening door and the right opening door, and each of the limiting plates has a limiting portion protruding inwards; both ends of the limiting bar respectively cooperate with two limiting portions to complete opening and closing of the left and right opening doors.

According to an embodiment of the present disclosure, each of both ends of the limiting bar is respectively mounted with a collision block, and two collision blocks press both ends of the limiting bar to complete opening and closing of the left opening door and the right opening door respectively.

According to an embodiment of the present disclosure, the limiting portion is provided with a through hole, the fixed housing body is provided with a fixing piece corresponding to a position of the limiting plate, the fixing piece is provided with a through hole, the limiting member is a bar member which passes through the through hole on the limiting portion and the through hole on the fixing piece, and a limiting cap is provided on a top end of the bar member.

According to an embodiment of the present disclosure, the limiting portion is provided with a through hole, an opening of the fixed housing body is provided with a flange, the flange is provided with a through hole, the limiting member is a bar which passes through the through hole on the limiting portion and the through hole on the flange, and a limiting cap is provided on a top end of the bar member.

According to an embodiment of the present disclosure, the passenger boarding bridge leveling mechanism further includes: a detection assembly for detecting whether the leveling wheel is in contact with the aircraft fuselage.

According to an embodiment of the present disclosure, the passenger boarding bridge leveling mechanism further includes a support, a bracket and a tension spring, the support is fixed to the end of the mounting bar; one end of the bracket is mounted with the leveling wheel, and the other end thereof is rotatably connected to the support; the tension spring is connected between the bracket and the support; the detection assembly includes a second detection switch mounted on an end of the mounting bar, the elastic member is configured so that the second detection switch is not triggered when the leveling wheel is not in contact with the aircraft fuselage, and a reaction force of the aircraft fuselage against the leveling wheel may rotate the bracket around the hinge point of the bracket and the support at an angle when the leveling wheel is in contact with and presses against the aircraft fuselage, the bracket triggers the second detection switch, and the second detection switch sends a trigger signal.

According to an embodiment of the present disclosure, the angle at which the bracket rotates around the hinge point of the bracket and the support ranges from 5° to 10°.

According to an embodiment of the present disclosure, the detection assembly further includes a limiting member mounted on the support and located above the bracket for limiting a clockwise rotation of the bracket under an action of the tension spring.

According to an embodiment of the present disclosure, the passenger boarding bridge leveling mechanism further includes a leveling wheel seat, the leveling wheel is mounted on the leveling wheel seat, the leveling wheel seat has an upper side and a lower side opposite to each other, the mounting bar has an upper side and a lower side opposite to each other, and the upper side of the leveling wheel seat is hingedly connected to the upper side of the mounting bar by a hinge, and a compression spring is mounted between the lower side of the leveling wheel seat and the lower side of the mounting bar; the detection assembly includes a second detection switch mounted on the leveling wheel seat and a mating member mounted on the mounting bar, the tension spring is configured so that the second detection switch is not triggered when the leveling wheel is not in contact with the aircraft fuselage, and a reaction force of the aircraft fuselage against the leveling wheel may rotate the leveling wheel seat around a hinge shaft of the leveling wheel seat by an angle when the leveling wheel is in contact with and presses against the aircraft fuselage, the mating member triggers the second detection switch, and the second detection switch sends a trigger signal.

According to an embodiment of the present disclosure, the drive device drives the driving bar to rotate by extension of its length, the detection assembly further includes a third detection switch mounted on the drive device, and the third detection switch is triggered to send a trigger signal when the drive device is shortened to the shortest length.

According to an embodiment of the present disclosure, the passenger boarding bridge leveling mechanism further includes a detection assembly for detecting whether the leveling wheel is in contact with the aircraft fuselage, the drawbar has a recess, the detection assembly includes a second detection switch mounted at a position of the lower end of the driving bar corresponding to the recess, the leveling wheel is not in contact with the aircraft fuselage when the second detection switch contacts or approaches the recess, and the second detection switch is triggered to send a trigger signal when the second detection switch moves away from the recess.

According to another aspect of the present disclosure, there is provided a passenger boarding bridge including a telescopic body, a front end of which is mounted with at least one passenger boarding bridge leveling mechanism of the present disclosure.

The above and other objects, features and advantages of the present disclosure will become more apparent from the description of the preferred embodiments of the present disclosure with reference to the accompanying drawings.

Figure 1:
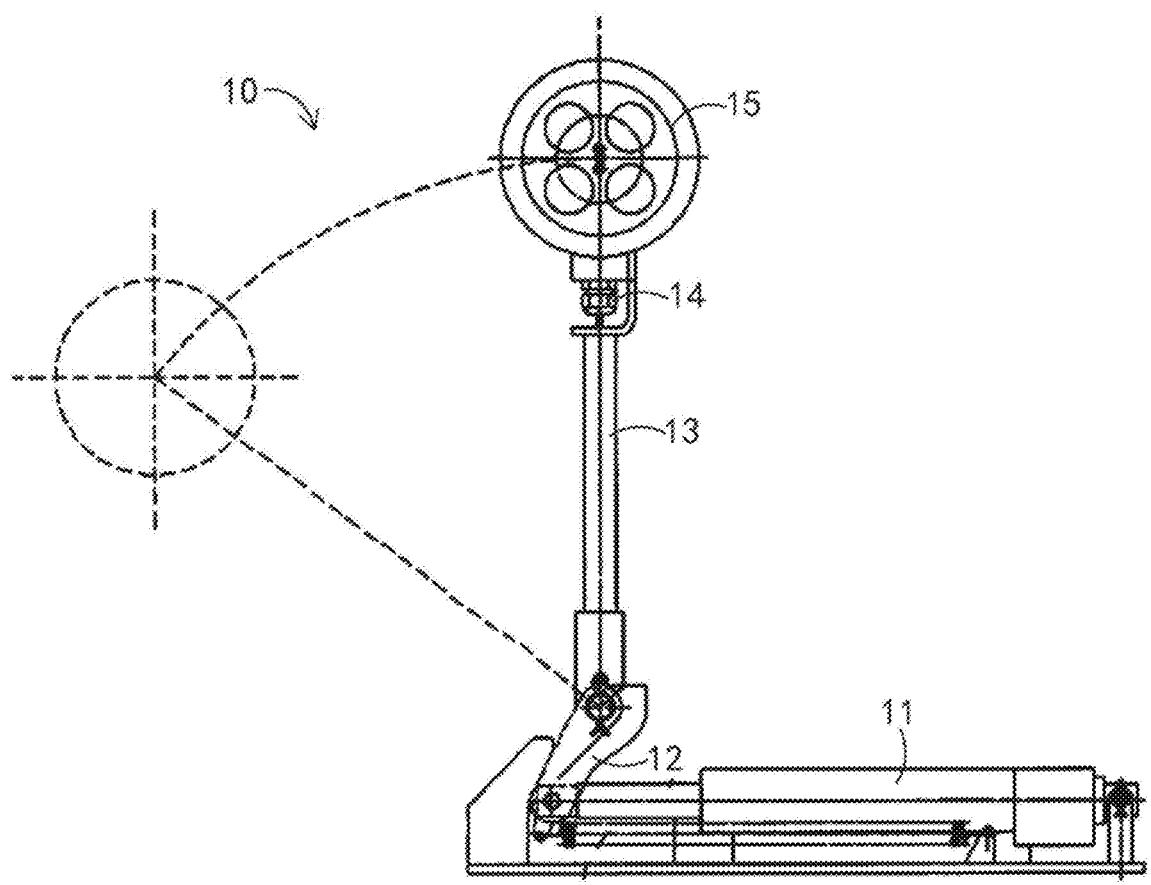
FIG. 1 shows a schematic view of a conventional passenger boarding bridge leveling mechanism.
Figure 2:
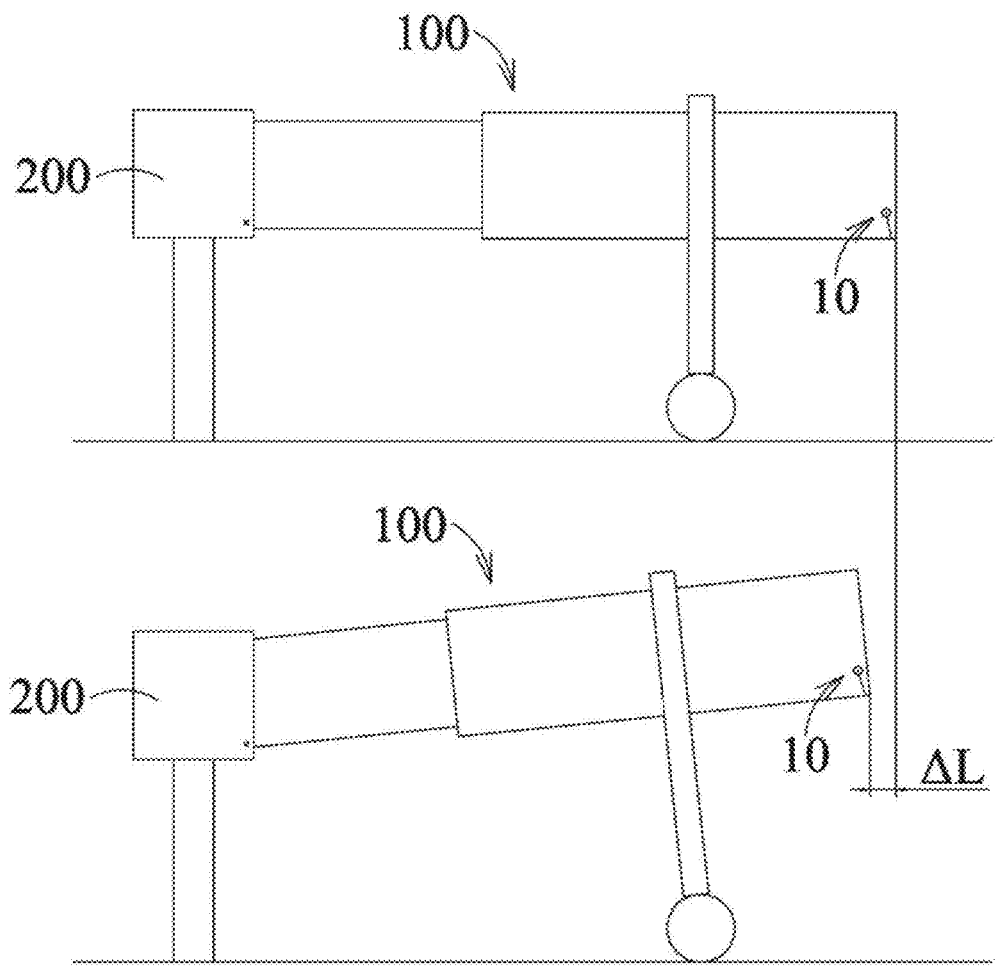
FIG. 2 is a comparison schematic view between the initial position of the passenger boarding bridge docking with the aircraft and the position after the front end of the passenger boarding bridge ascends.
Figure 3:
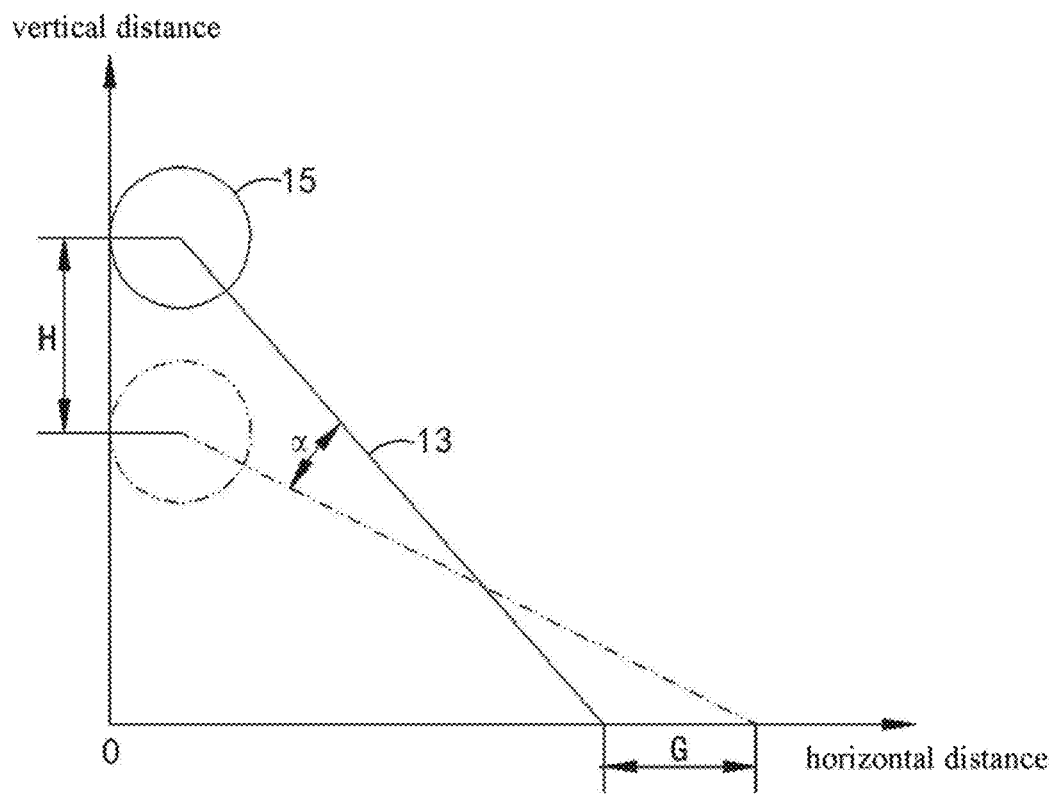
FIG. 3 shows a schematic view of the detection error caused by the angular change of the driving bar in the leveling mechanism.
Figure 4:
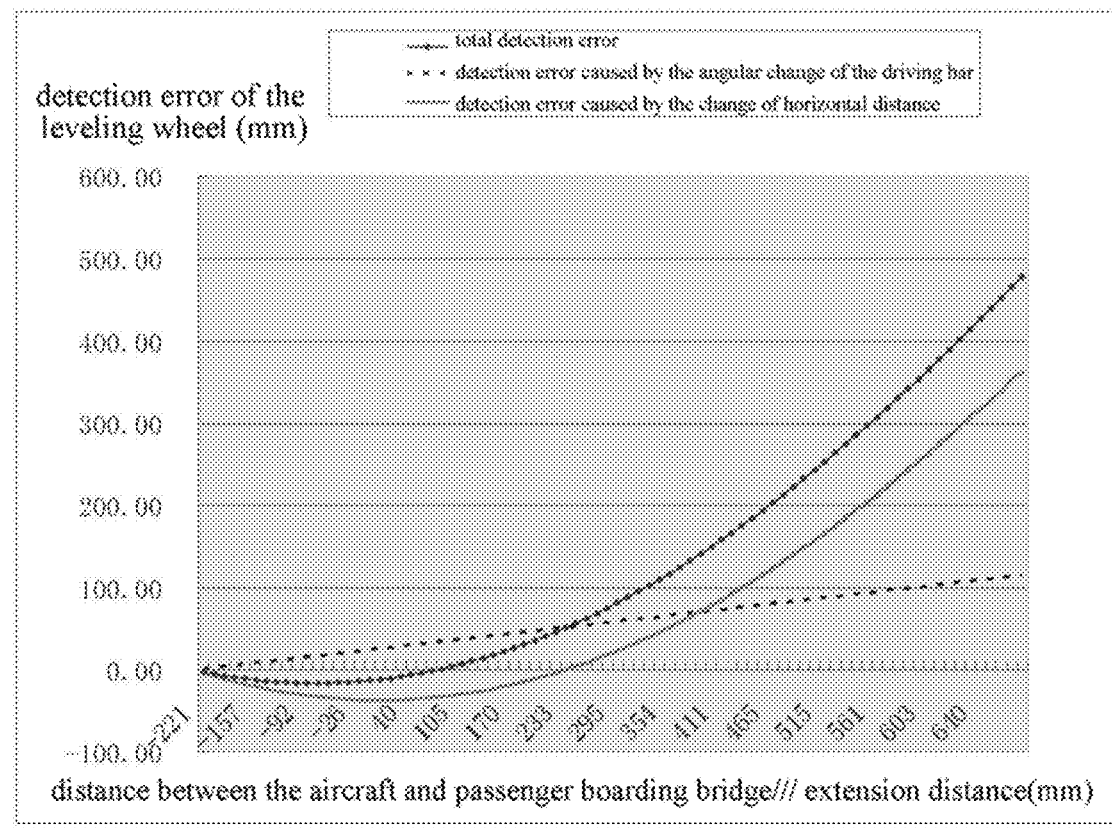
FIG. 4 shows the detection error curve of a conventional passenger boarding bridge leveling mechanism.

In the figures: 2: mounting base; 31: driving bar; 32: driven bar; 33: mounting bar; 41: drive device; 34: drawbar; 51: tension spring; 6: first detection switch; 7: leveling wheel; 500: aircraft fuselage; 100: passenger boarding bridge; 20: opening; 21: top plate; 22: bottom plate; 23: two side plates; 24: front plate; 25: rear plate; 8: housing assembly; 81: fixed housing body; 82: left opening door; 83: right opening door; 84: torsion spring; 85: limiting member; 86: limiting bar; 87: limiting plate; 871: limiting portion; 861: collision block; 811: fixing piece; 810: flange; 71: leveling wheel seat; 72: compression spring; 73: second detection switch; 75: third detection switch; 92: bracket; 91: support; 93: tension spring; 94: second detection switch; 90: second detection switch.

DETAILED DESCRIPTION

Example embodiments will now be described more fully with reference to the accompanying drawings. However, the example embodiments can be embodied in a variety of forms and should not be construed as being limited to the embodiments set forth herein; instead, these embodiments are provided so that the present disclosure will be complete and comprehensive, and concepts of example embodiments will fully be given to those skilled in the art. The same reference numerals in the drawings denote the same or similar structures, and thus their detailed descriptions will be omitted.

The design concept of the passenger boarding bridge leveling mechanism of the present disclosure is that the movement trajectory of the leveling wheel in the extension process of the passenger boarding bridge is changed by mounting the leveling wheel on a four-bar linkage mechanism, so that the movement trajectory of the leveling wheel is approximately straight line. That is to say, the present disclosure reduces the vertical displacement of the leveling wheel during the extension process of the passenger boarding bridge by mounting the leveling wheel on the four-bar linkage mechanism. Therefore, by using the passenger boarding bridge leveling mechanism of the present disclosure, it is possible to effectively reduce the detection error of misjudging that the aircraft fuselage ascends or descends, caused by the extension of the passenger boarding bridge.

Figure 5A:
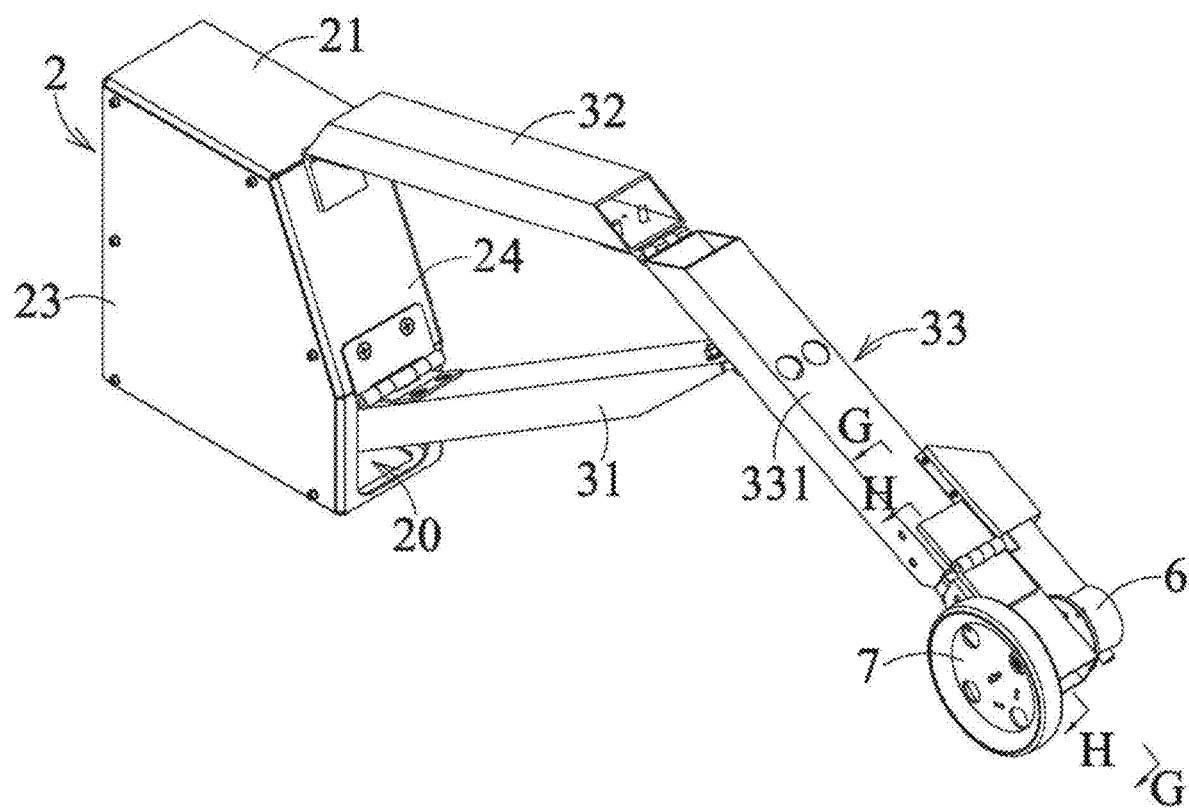
FIG. 5A is a perspective structural schematic view of an exemplary passenger boarding bridge leveling mechanism of the present disclosure in an open state.
Figure 5B:
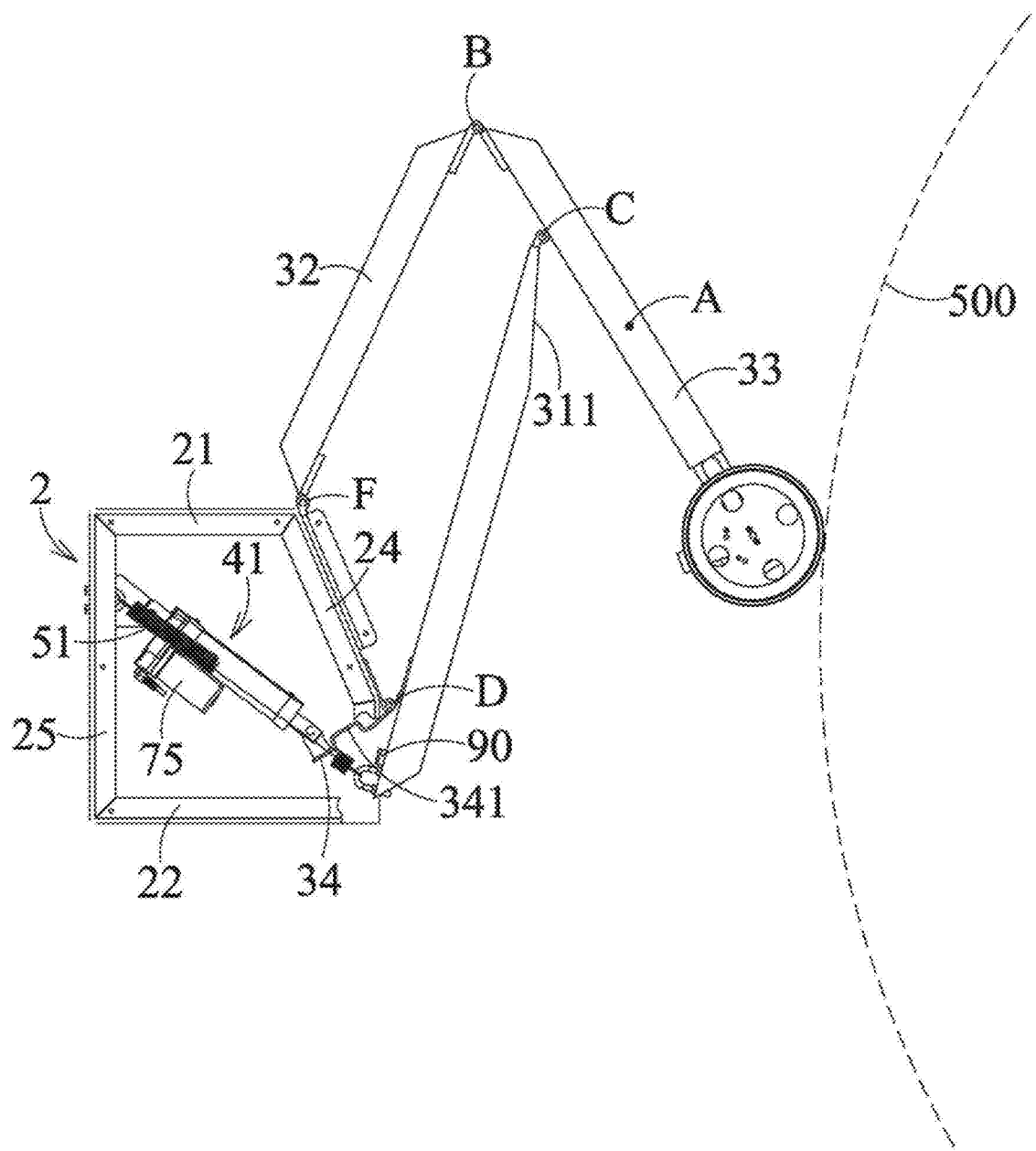
FIG. 5B is a front view showing a state in which the passenger boarding bridge leveling mechanism shown in FIG. 5A is in contact with the aircraft fuselage.

Referring to FIG. 5A and FIG. 5B, FIG. 5A is a perspective structural schematic view of an exemplary passenger boarding bridge leveling mechanism of the present disclosure in an opened state; FIG. 5B is a front view showing a state in which the passenger boarding bridge leveling mechanism shown in FIG. 5A is in contact with the aircraft fuselage 500. The passenger boarding bridge leveling mechanism of the present disclosure is mounted on a passenger boarding bridge for controlling a front end of the passenger boarding bridge to ascend or descend following the aircraft fuselage so that the passenger boarding bridge may always maintain to dock with the aircraft fuselage at a suitable height position thereof.

As shown in FIG. 5A and FIG. 5B, an embodiment of the passenger boarding bridge leveling mechanism of the present disclosure includes: a mounting base 2, a driving bar 31, a driven bar 32, a mounting bar 33, a drive device 41, a drawbar 34, and a tension spring 51. The mounting base 2, the driving bar 31, the driven bar 32 and the mounting bar 33 may form a four-bar linkage mechanism, and the mounting bar 33 extends beyond the four-bar linkage mechanism.

The mounting base 2 may usually be fixedly mounted on a side of the front end of the passenger boarding bridge. The driving bar 31 is hinged to the mounting base 2 at a position located at its lower portion adjacent to its lower end. The lower end of the driven bar 32 is hinged to the mounting base 2, and the driven bar 32 is located above the driving bar 31. One end of the mounting bar 33 is hinged to an upper end of the driven bar 32, and the other end thereof is mounted with a first detection switch 6 and a leveling wheel 7. The first detection switch 6 may be, for example, a limit switch or an encoder of which arrangement on the leveling wheel 7 may be identical to the prior art. At least one of the driving bar 31, the driven bar 32 and the mounting bar 33 may be hollow and tubular, which may reduce cost.

The drive device 41 is mounted on the mounting base 2 and is capable of driving the lower end of the driving bar 31 to rotate about its hinge point with the mounting base 2. The specific structure of the drive device 41 may be various, such as an air cylinder, an oil cylinder, a motor and rack & pinion mechanism, a motor and worm gear mechanism, a motor and screw nut mechanism, and the like. The main function of the drive device 41 is to automatically retract the passenger boarding bridge leveling mechanism of the present disclosure. In some other embodiments, the passenger boarding bridge leveling mechanism may be manually retracted without providing the drive device, or the passenger boarding bridge leveling mechanism may not be retracted.

One end of the drawbar 34 is connected to the lower portion of the driving bar 31, and the other end is connected to the drive device 41. The drawbar 34 may be rigid or flexible. In some other embodiments, the drawbar 34 may not be provided.

One end of the tension spring 51 is connected to the lower end of the driving bar 31, and the other end is connected to the mounting base 2. The tension spring 51 has a preload force, under which the leveling wheel 7 of the passenger boarding bridge leveling mechanism always maintains a tendency of extending outwards, so that the aircraft fuselage 500 can be contacted with a certain pressure, thereby making the contact of the leveling wheel 7 with the aircraft fuselage 500 more reliable. In other embodiments, the tension spring 51 may be replaced by other preload devices such as a compression spring, a torsion spring, a counterweight device, a constant torque motor, a resilient rubber member, and the like.

The upper end of the driving bar 31 is hinged to the mounting bar 33. In another embodiment, the upper end of the driving bar 31 is adjacent to a hinge point B of the mounting bar 33 and the driven bar 32 at a hinge point C of the mounting bar 33, i.e., the upper end of the driving bar 31 is located at a position of the hinge point C of the mounting bar 33, between a midpoint A of a length of the mounting bar 33 and the hinge point B of the upper end of the mounting bar 33 and the driven bar 32. Further, a distance of the upper end of the driving bar 31 from the hinge point C of the mounting bar 33 to the hinge point B of the mounting bar 33 and the driven bar 32 is less than or equal to ¼ of an entire length of the mounting bar 33.

A side surface of the driving bar 31 facing the mounting bar 33 is an inclined surface 311 which is attached to the mounting bar 33 in a retracted state of the passenger boarding bridge leveling mechanism. This can reduce a volume of the passenger boarding bridge leveling mechanism of the present disclosure when it is retracted.

A length ratio of the driving bar 31, the driven bar 32 and the mounting bar 33 may range from (1.1~1.3):(0.9~1.1):(1.1~1.3), for example, the length ratio of the driving bar 31, the driven bar 32 and the mounting bar 33 may be 1.2:1:1.2, or 1.1:0.9:1.3, or 1.3:1.1:1.1, and the like.

The conversion process of the passenger boarding bridge leveling mechanism of the present disclosure from an opened state to a retracted state is described below: usually, the passenger boarding bridge leveling mechanism of the present disclosure is in the opened state under the action of a preload device such as the tension spring 51, and the opened state of the passenger boarding bridge leveling mechanism corresponds to the extended state of the leveling wheel 7. In detail, the tension spring 51 has a preload force that pulls the lower end of the driving bar 31 so that the driving bar 31 rotates clockwise about its hinge point D with the mounting base 2, and the driven bar 32 then rotates about its hinge point F with the mounting base 2, so that the driving bar 31 pushes the mounting bar 33 to rotate counterclockwise about the hinge point B of the mounting bar 33 and the driven bar 32, and the leveling wheel 7 mounted on the end of the mounting bar 33 then rotates counterclockwise and extends away from the mounting base 2 until it is in contact with an obstacle such as the aircraft fuselage 500 and stops. At this time, due to an action of the tension spring 51, the leveling wheel 7 presses against the aircraft fuselage 500 with a certain pressure. When the passenger boarding bridge leveling mechanism of the present disclosure is switched from the opened state to the retracted state, the drive device 41 drives the lower end of the driving bar 31, and a driving force of the drive device 41 may overcome an acting force of the tension spring 51, so that the driving bar 31 rotates counterclockwise about its hinge point D with the mounting base 2, and the driven bar 32 then rotates counterclockwise about its hinge point F with the mounting base 2, so that the driving bar 31 pulls the mounting bar 33 to rotate clockwise about the hinge point B of the mounting bar 33 and driven bar 32, and the leveling wheel 7 mounted on the end of the mounting bar 33 rotates clockwise to retract toward a direction of moving adjacent to the mounting base 2 until the mounting bar 33 is attached to the inclined surface 311 of the driving bar 31. At this time, the passenger boarding bridge leveling mechanism of the present disclosure is in a fully retracted state.

In the passenger boarding bridge leveling mechanism of the present disclosure, the mounting base 2, the driving bar 31, the driven bar 32, and the mounting bar 33 constitute a four-bar linkage mechanism, and the four-bar linkage mechanism may be retracted and opened smoothly and may not be prone to be jammed, so that the leveling wheel 7 driven by the four-bar linkage mechanism may also be very smoothly switched between an extended state (corresponding to the opened state of the passenger boarding bridge leveling mechanism) and a retracted state (corresponding to the retracted state of the passenger boarding bridge leveling mechanism).

Figure 5C:
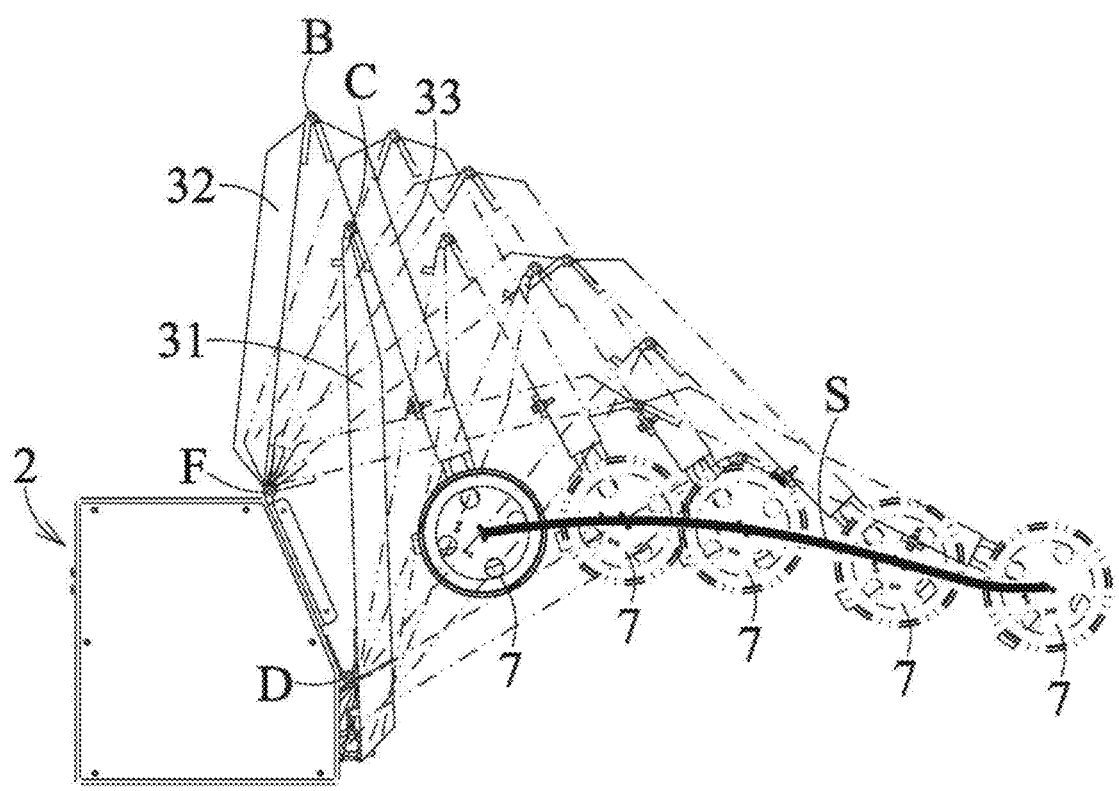
FIG. 5C is a schematic view showing the movement trajectory of the leveling wheel in the passenger boarding bridge leveling mechanism shown in FIG. 5A.

Referring to FIG. 5C, FIG. 5C is a schematic view showing the movement trajectory of the leveling wheel in the passenger boarding bridge leveling mechanism shown in FIG. 5A. As shown in FIG. 5C, in the passenger boarding bridge leveling mechanism of the present disclosure, the movement trajectory S of the leveling wheel 7 is approximately linear. When the aircraft fuselage ascends or descends, the front end of the passenger boarding bridge follows the aircraft fuselage to ascend or descend, and the front end of the passenger boarding bridge generates a horizontal displacement in the horizontal direction. At this time, although each of the hinge points D and F in the passenger boarding bridge leveling mechanism generates a horizontal displacement of a corresponding magnitude in the horizontal direction, the driving bar 31 and the driven bar 32 in the passenger boarding bridge leveling mechanism may simultaneously rotate in a clockwise or counterclockwise direction, while the driving bar 31 pushes or pulls the mounting bar 33 to rotate in a direction opposite to the direction of rotation of the driving bar 31, thereby pushing the leveling wheel 7 mounted at the end of the mounting bar 33 to have a larger displacement in the horizontal direction, however, the displacement of the leveling wheel 7 in the vertical direction is very small or even zero, thereby forming an approximately linear movement trajectory S of the leveling wheel 7. That is to say, in the present disclosure, since the leveling wheel 7 is mounted on one of bars of the four-bar linkage mechanism, the horizontal displacement of the hinge points D, F does not directly cause a large displacement of the leveling wheel 7 in the vertical direction. After the conversion of the four-bar linkage mechanism, the horizontal displacement of the hinge points D, F only causes a small displacement of the leveling wheel 7 in the vertical direction, and the displacement of the leveling wheel 7 in the vertical direction is even zero.

Figure 5D:
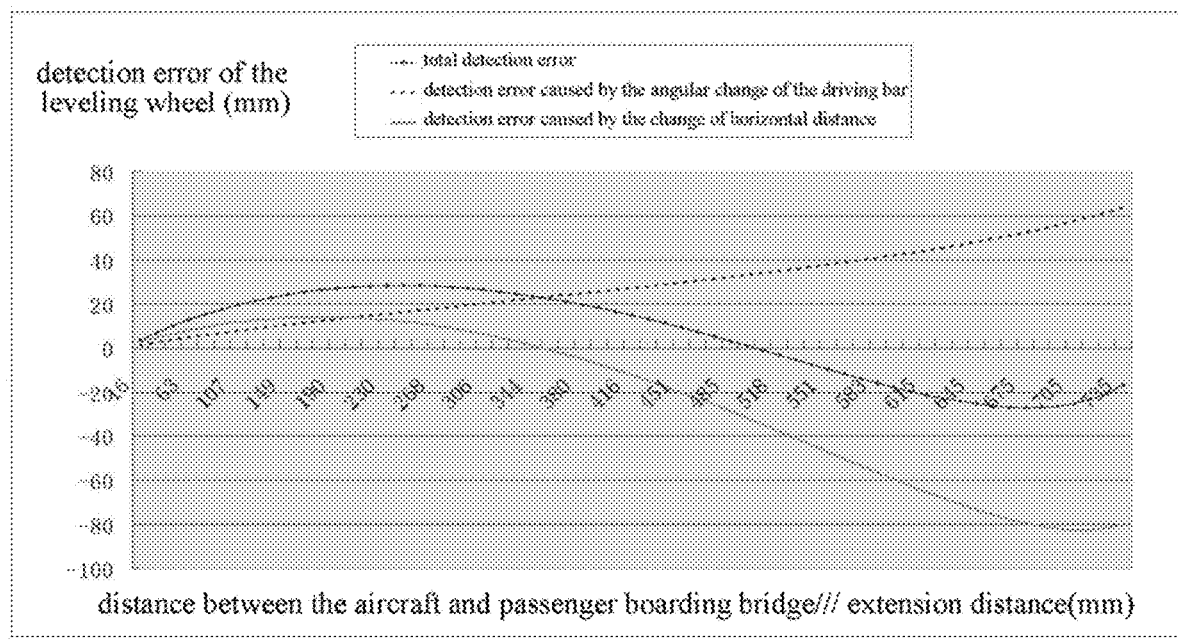
FIG. 5D shows the detection error curve of the passenger boarding bridge leveling mechanism shown in FIG. 5A.

Referring to FIG. 5D, in the passenger boarding bridge leveling mechanism of the present disclosure, the movement trajectory of the leveling wheel 7 is approximately linear, and the displacement of the front end of the passenger boarding bridge in the horizontal direction (the horizontal displacement of the hinge points D, F) only makes the leveling wheel 7 generate little or no displacement in the vertical direction, so that the passenger boarding bridge leveling mechanism of the present disclosure may significantly reduce the detection error caused by the horizontal displacement of the front end of the passenger boarding bridge. As shown in FIG. 5D, as the retraction distance of the front end of the passenger boarding bridge 100 increases (further and further away from the aircraft), an error curve due to the change of the horizontal distance is wavy, part of the curve is located above the coordinate axis, and part of the curve is located below the coordinate axis, i.e., in the present disclosure, the detection error caused by the change of the horizontal distance presents a vertical fluctuation as the retraction distance of the front end of the passenger boarding bridge 100 increases; in addition, as shown in FIG. 5D, as the retraction distance of the front end of passenger boarding bridge 100 increases, the detection error curve caused by an angular change of the mounting bar 33 presents a tendency of slowly ascending, i.e., the detection error caused by the angular change of the mounting bar only slowly increases without a rapid increase as the retraction distance of the front end of the passenger boarding bridge 100 increases. As shown in FIG. 5D, in the present disclosure, the total detection error curve is wavy as the distance of the passenger boarding bridge away from the aircraft increases, i.e., the total detection error fluctuates vertically within a small range, rather than continuously increases. Therefore, the passenger boarding bridge leveling mechanism of the present disclosure has high detection accuracy.

In another embodiment, the mounting base 2 has an inclined plate portion, a hollow portion and an opening. The driven bar 32 and the driving bar 31 are respectively hinged to upper and lower ends of the inclined plate portion, and the lower end of the driving bar 31 extends into the hollow portion through the opening, and the drive device 41 is mounted on the hollow portion. Thus, not only does the passenger boarding bridge leveling mechanism of the present disclosure present a good aesthetic, the mounting base 2 also protects the drive device 41, which is advantageous for prolonging the service life of the passenger boarding bridge leveling mechanism. In detail, as shown in FIGS. 5A and 5B, the mounting base 2 may be in the shape of a box having an opening 20 which box may be composed of a top plate 21, a bottom plate 22, two side plates 23, a front plate 24, and a rear plate 25 which are fixedly connected, these plates enclose the hollow portion. The front plate 24 may constitute the inclined plate portion, and the opening 20 is formed between the lower end of the front plate 24 and the bottom plate 22. The lower end of the driven bar 32 is hinged to the upper end of the front plate 24, the lower portion of the driving bar 31 is hinged to the lower end of the front plate 24, and the lower end of the driving bar 31 extends into the hollow portion through the opening 20. The drive device 41 may be for example an air cylinder or an oil cylinder, in which a cylinder body of the air cylinder or the oil cylinder is mounted on the rear plate 25, a piston rod of the air cylinder or the oil cylinder may be hinged to the lower end of the drawbar 34. When the piston rod extends out of the cylinder body, the lower end of the driving bar 31 may be contacted and pushed, and be capable of pushing the driving bar 31 to rotate about the hinge point D of the driving bar 31 and the front plate 24.

The above description of the mounting base 2 and the drive device 41 is merely exemplary and does not constitute a limitation of the present disclosure, and the mounting base 2 and the drive device 41 of other configurations are also applicable to the present disclosure.

Figure 6A:
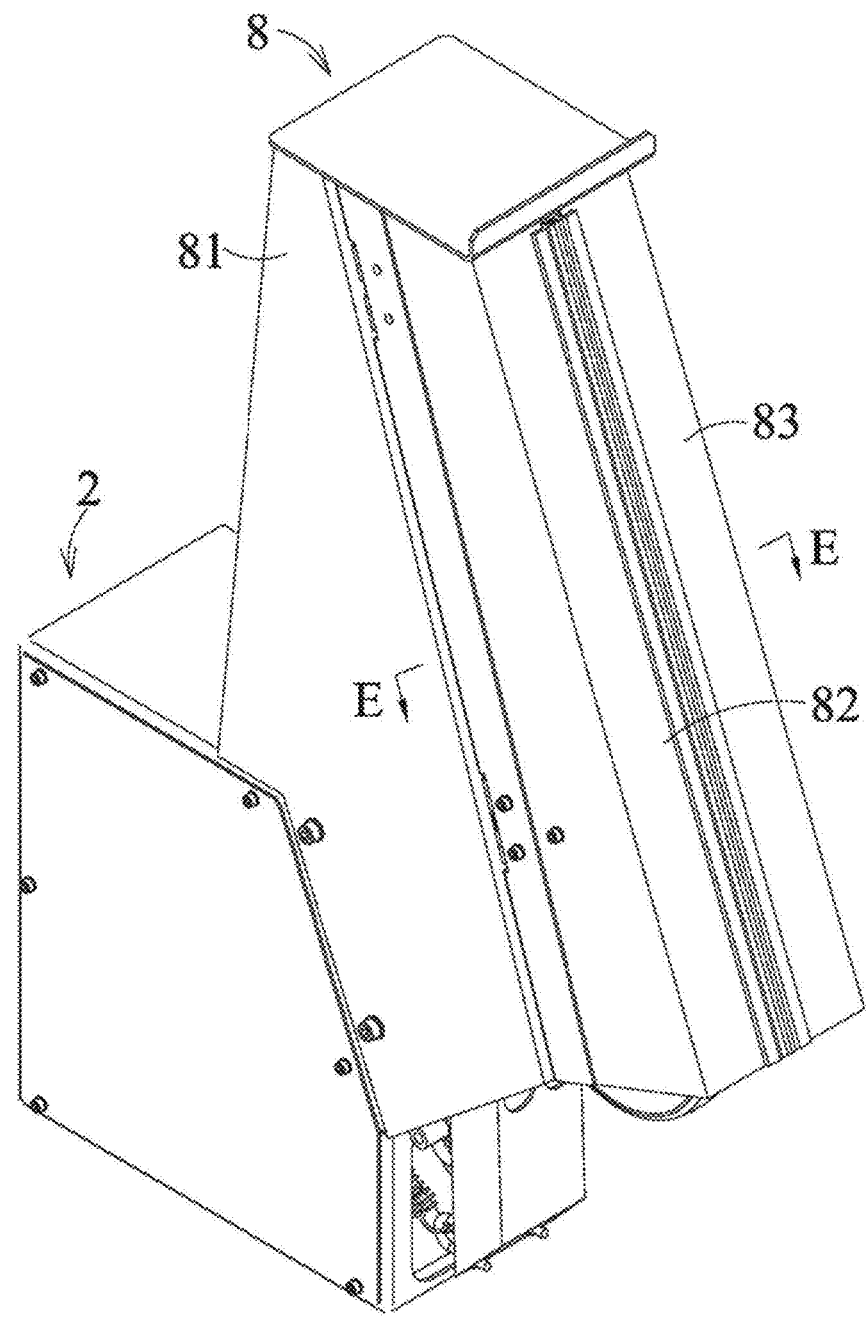
FIG. 6A is a perspective structural schematic view showing an exemplary passenger boarding bridge leveling mechanism of the present disclosure, wherein the passenger boarding bridge leveling mechanism is accommodated in a housing assembly.
Figure 6B:
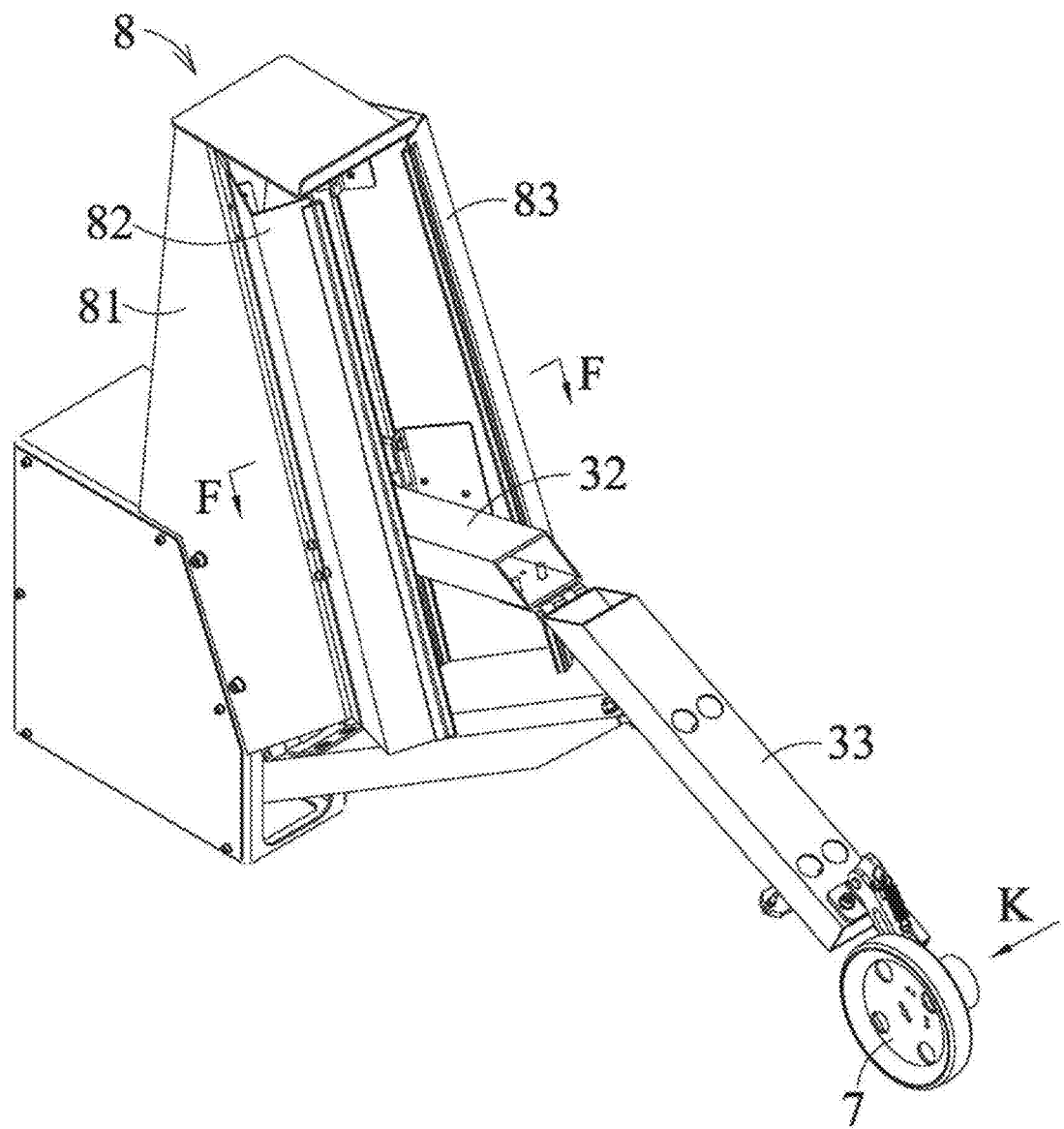
FIG. 6B is a perspective structural schematic view showing the passenger boarding bridge leveling mechanism shown in FIG. 6A, wherein the leveling wheel extends out of the housing assembly.

Referring to FIG. 6A and FIG. 6B, FIG. 6A is a perspective structural schematic view showing an exemplary passenger boarding bridge leveling mechanism of the present disclosure, wherein the passenger boarding bridge leveling mechanism is accommodated in a housing assembly 8; FIG. 6B is a perspective structural schematic view showing the passenger boarding bridge leveling mechanism shown in FIG. 6A, wherein the leveling wheel extends out of the housing assembly 8. As shown in FIG. 6A and FIG. 6B, in another embodiment, the passenger boarding bridge leveling mechanism of the present disclosure further includes a housing assembly 8 so that the passenger boarding bridge leveling mechanism may be accommodated in the housing assembly 8 and is protected from external adverse factors such as rain and sand when the passenger boarding bridge leveling mechanism is in the retracted state.

The housing assembly 8 includes a fixed housing body 81, a left opening door 82, and a right opening door 83. The fixed housing body 81 is fixed to the mounting base 2 and has an accommodating space and an opening; one side of the left opening door 82 is hinged to one side of the opening of the fixed housing body 81; and one side of the right opening door 83 is hinged to the other side of the opening of the fixed housing body 81. The left opening door 82 and the right opening door 83 may close the opening in the closed state. When the left opening door 82 and the right opening door 83 are in the closed state, the fixed housing body 81, the left opening door 82 and the right opening door 83 together constitute an enclosed chamber, and the passenger boarding bridge leveling mechanism may be accommodated in the enclosed chamber in the retracted state. The left opening door 82 and the right opening door 83 are opened so that part of the driven bar 32, the mounting bar 33 and the leveling wheel 7 of the passenger boarding bridge leveling mechanism may then extend out of the housing assembly 8.

Figure 6C:
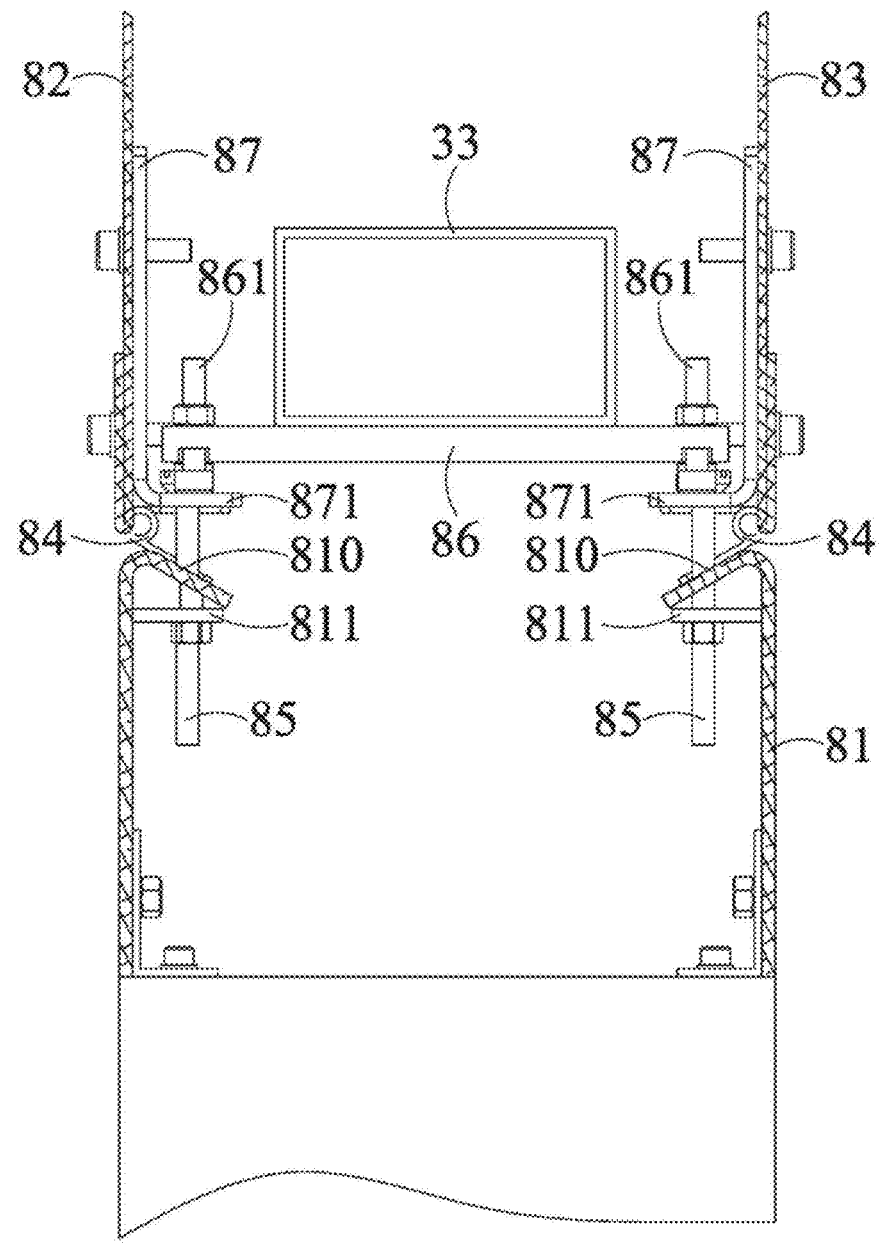
FIG. 6C is a schematic cross-sectional view, taken along line E-E, of the passenger boarding bridge leveling mechanism shown in FIG. 6A.
Figure 6D:
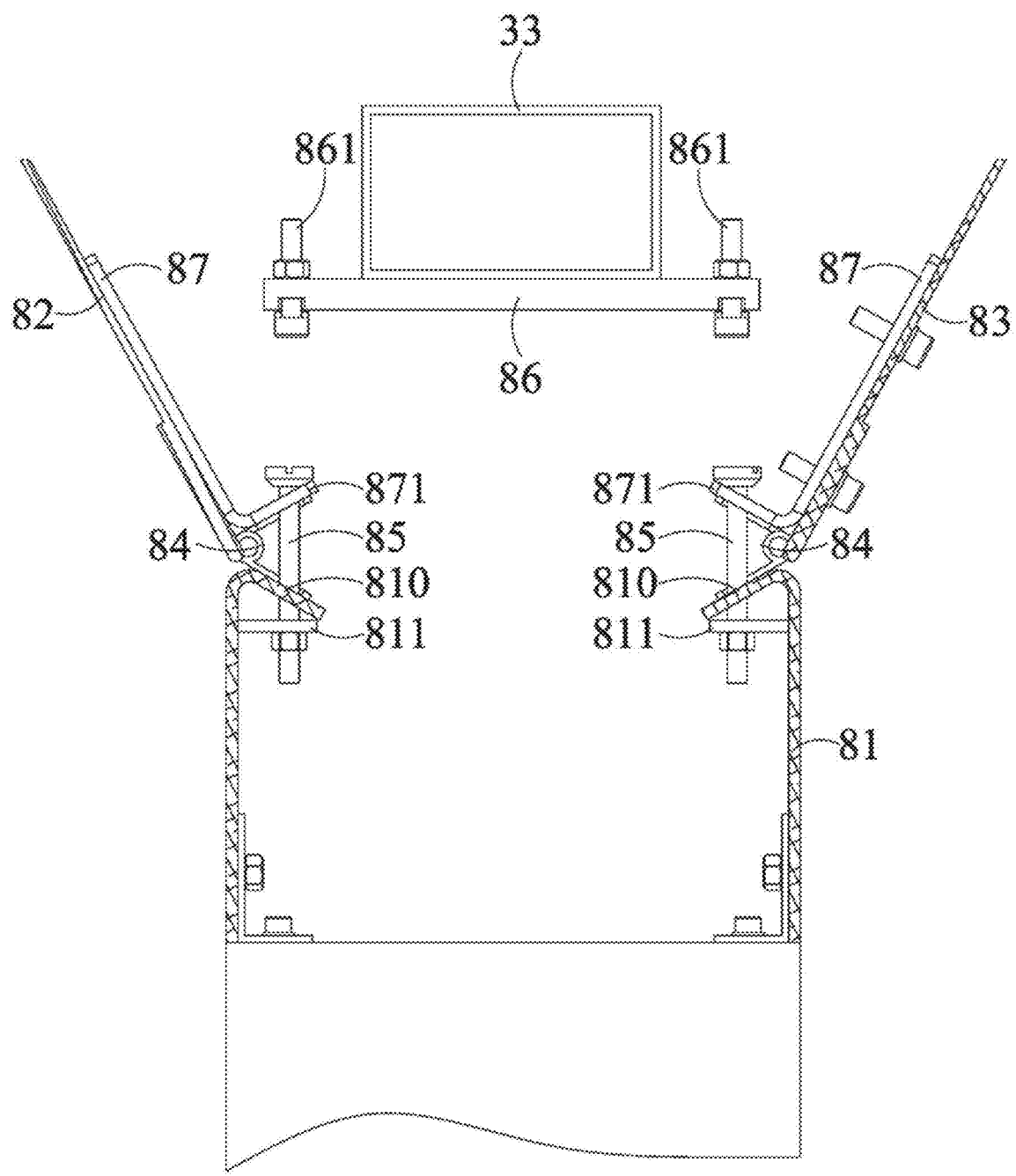
FIG. 6D is a schematic cross-sectional view, taken along line F-F, of the passenger boarding bridge leveling mechanism shown in FIG. 6B.

Referring to FIG. 6C and FIG. 6D, FIG. 6C is a schematic cross-sectional view, taken along line E-E, of the passenger boarding bridge leveling mechanism shown in FIG. 6A showing the closed state of the housing assembly 8; FIG. 6D is a schematic cross-sectional view, taken along line F-F, of the passenger boarding bridge leveling mechanism shown in FIG. 6B showing the opened state of the housing assembly 8. In another embodiment, the housing assembly 8 further includes at least two torsion springs 84, at least two limiting members 85, and a door opening mechanism. At least one torsion spring 84 is mounted at the junction of the left opening door 82 and the fixed housing body 81, and at least one torsion spring 84 is mounted at the junction of the right opening door 83 and the fixed housing body 81. The torsion of the torsion spring 84 makes the left opening door 82 and the right opening door 83 maintain an opening tendency, i.e., the torque of the torsion spring 84 causes the left opening door 82 and the right opening door 83 to be in an opened state without the action of external force. At least two limiting members 85 are respectively used to limit the maximum angle at which the left opening door 82 and the right opening door 83 may be opened. It should be noted that the present disclosure does not necessarily use the limiting member 85, i.e., when it is not necessary to define the maximum opening angle of the left opening door 82 and the right opening door 83, the limiting member 85 may be omitted. The door opening mechanism is used for automatically opening or closing the left opening door 82 and the right opening door 83. The left opening door 82 and the right opening door 83 may also be manually opened without providing the door opening mechanism.

In another embodiment, the door opening mechanism in the housing assembly 8 includes a limiting bar 86 and two limiting plates 87. The limiting bar 86 is fixed to the mounting bar 33, and both ends of the limiting bar 86 extend out of the mounting bar 33. The limiting bar 86 may be vertically fixed to the mounting bar 33 or may be inclined at an acute angle with respect to the limiting bar 86. Two limiting plates 87 are respectively fixed to the inner side of the left opening door 82 and the right opening door 83, and each of the limiting plates 87 has a limiting portion 871 protruding inwards. During a process in which the passenger boarding bridge leveling mechanism is switched from the opened state to the retracted state, both ends of the limiting bar 86 respectively press against two limiting portions 871 to bring the left opening door 82 and the right opening door 83 to rotate inwards to be closed.

Further, both ends of the limiting bar 86 are respectively mounted with a collision block 861. Two collision blocks 861 press against two limiting portions to bring the left opening door 82 and the right opening door 83 to be closed. The collision block 861 may be a structure integrated with the limiting bar 86, or may be a separate structure such as a bolt mounted on the limiting bar 86.

In another embodiment, the limiting portion 871 is provided with a through hole. The fixed housing body 81 is provided with a fixing piece 811 at a position corresponding to the limiting plate 87. The fixing piece 811 is provided with a through hole, and the limiting member 85 is a bar member such as a limiting pin or a limiting bolt, which passes through the through hole on the limiting portion 871 and the through hole on the fixing piece 811, and a limiting cap is provided on a top end of the bar member to prevent the bar member from dropping through two through holes. Of course, the present disclosure is not limited thereto, and other ways of preventing the rod from dropping may be applicable to the present disclosure. In another embodiment, the limiting portion 871 is provided with a through hole, the opening of the fixed housing body 81 is provided with a flange 810, the flange 810 is provided with a through hole, the limiting member 85 is a bar member such as a limiting pin or a limiting bolt, which passes through the through hole on the limiting portion 871 and the through hole on the flange 810, and a limiting cap or other structure capable of preventing the bar member from dropping is provided on a top end of the bar member.

In another embodiment, the passenger boarding bridge leveling mechanism of the present disclosure further includes a detection assembly for detecting whether the leveling wheel 7 is in contact with the aircraft fuselage.

Figure 7A:
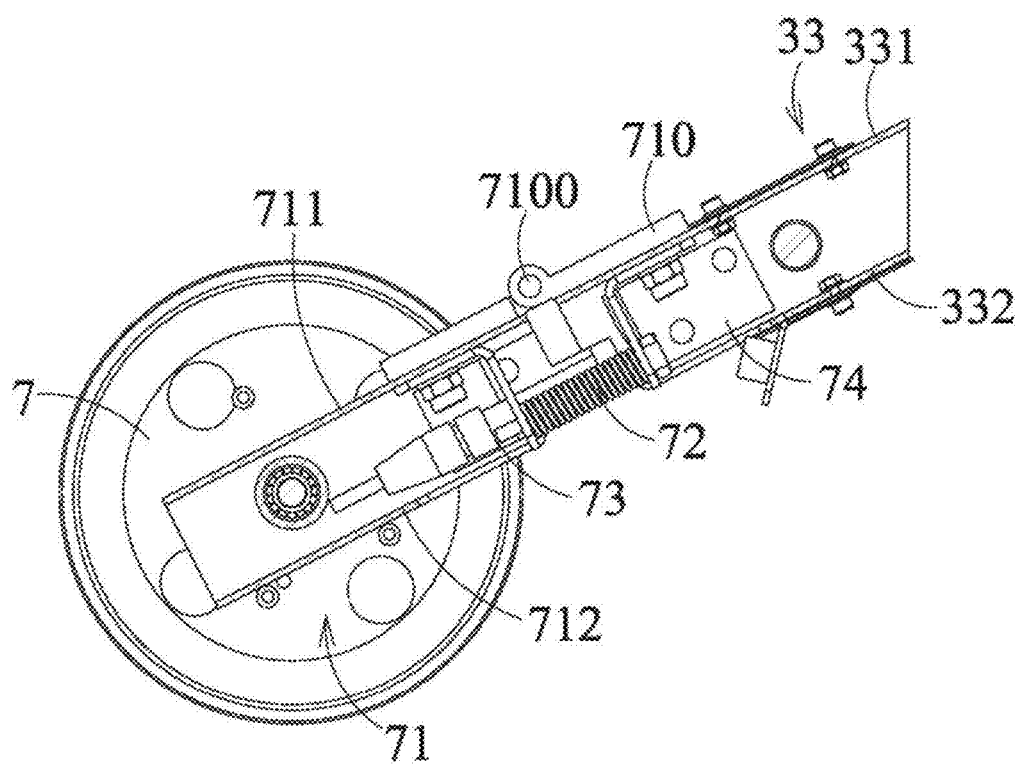
FIG. 7A is a schematic cross-sectional view, taken along the G-G of the passenger boarding bridge leveling mechanism shown in FIG. 5A, showing a structure of a detection assembly.
Figure 7B:
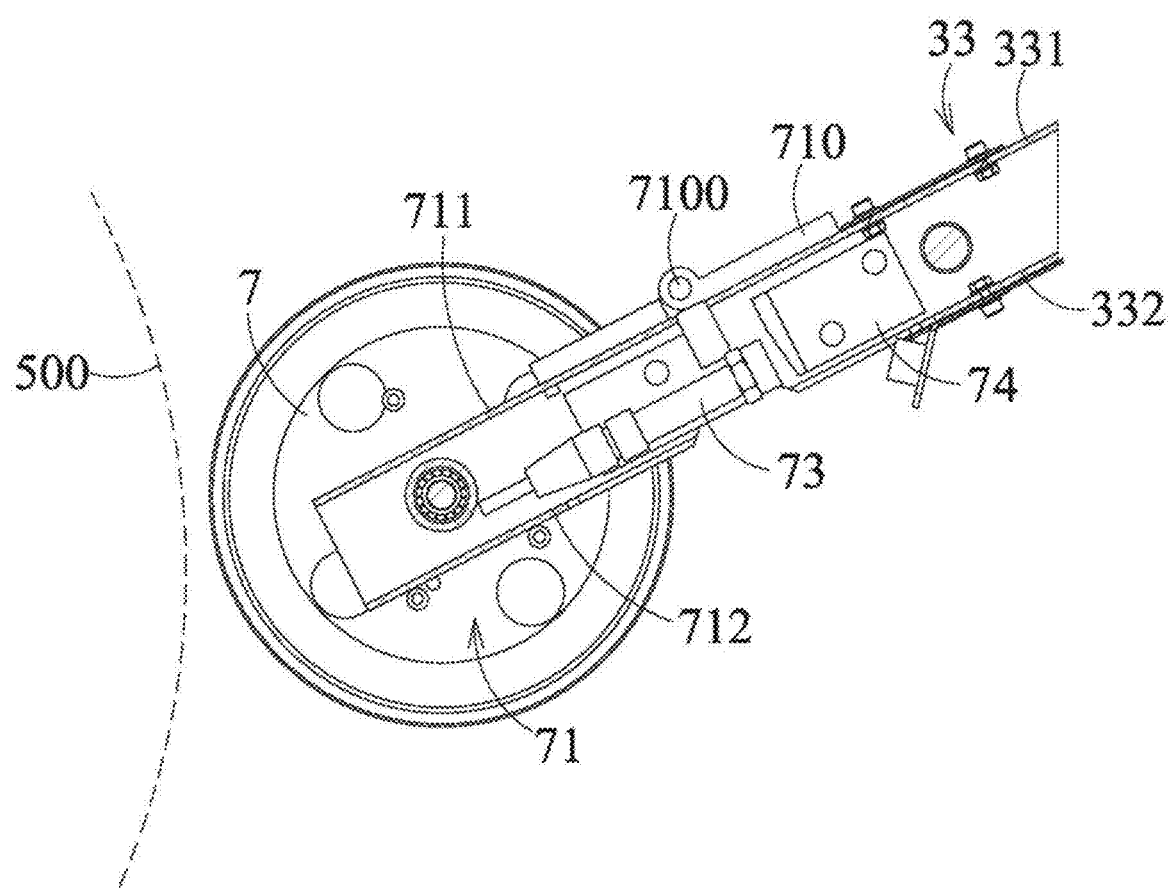
FIG. 7B is a schematic cross-sectional view, taken along line H-H, of the passenger boarding bridge leveling mechanism shown in FIG. 5A, showing a state in which the leveling wheel is not in contact with the aircraft.
Figure 7C:
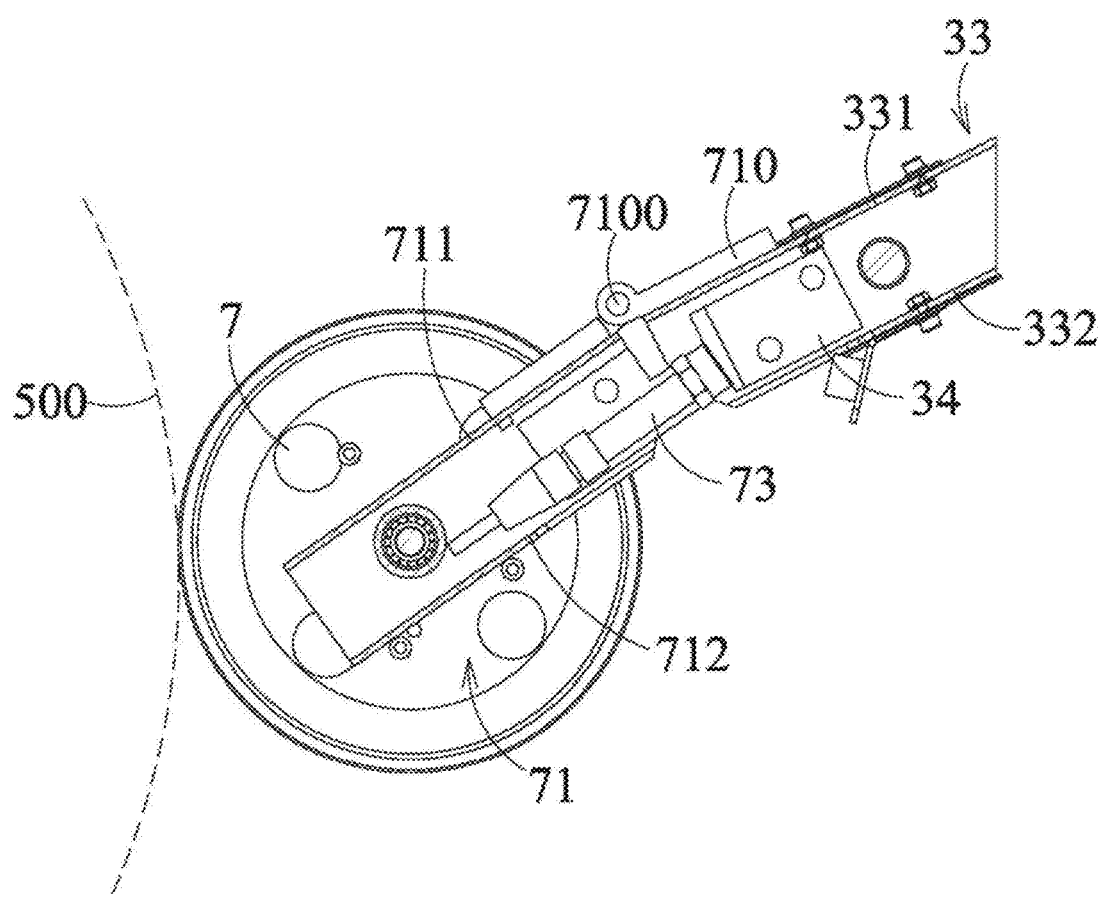
FIG. 7C is a schematic cross-sectional view, taken along line H-H, of the passenger boarding bridge leveling mechanism shown in FIG. 5A, showing a state in which the leveling wheel is in contact with the aircraft.

Referring to FIG. 5A, FIG. 7A, FIG. 7B, and FIG. 7C, FIG. 7A is a schematic cross-sectional view, taken along the G-G, of the passenger boarding bridge leveling mechanism shown in FIG. 5A, showing a structure of a detection assembly; FIG. 7B and FIG. 7C are schematic cross-sectional views, taken along line H-H, of the passenger boarding bridge leveling mechanism shown in FIG. 5A, respectively showing a state in which the leveling wheel is not in contact with the aircraft and a state in which the leveling wheel is in contact with the aircraft.

In the embodiment shown in FIGS. 5A and 7A, the mounting bar 33 in the passenger boarding bridge leveling mechanism has an upper side 331 and a lower side 332 opposite to each other. The passenger boarding bridge leveling mechanism further includes a leveling wheel seat 71 to which the leveling wheel 7 is mounted. The leveling wheel seat 71 has an upper side 711 and a lower side 712 opposite to each other. The upper side 711 of the leveling wheel seat 71 and the upper side 331 of the mounting bar 33 are hingedly connected by a hinge 710, and a compression spring 72 is mounted between the lower side 712 of the leveling wheel seat 71 and the lower side 332 of the mounting bar 33. The compression spring 72 may also be replaced by other resilient structures such as a compression rubber strip.

In this embodiment, the detection assembly includes a second detection switch 73 mounted on the leveling wheel seat 71 and a mating member 74 mounted on the mounting bar 33. The mating member 74 may be a partial structure of the mounting bar 33 or a plate member mounted on the mounting bar 33 (see FIG. 7A).

Referring to FIG. 7A, in the natural state, i.e., the leveling wheel 7 is not affected under the action of the external force such as the pressure of the aircraft fuselage, a center line of the leveling wheel seat 71 and a center line of the mounting bar 33 may be on the same line; under the action of the preload force of the compression spring 72, the center line of the leveling wheel seat 71 and the center line of the mounting bar 33 may not be in a straight line to form an obtuse angle.

Referring to FIG. 7B and FIG. 7C, when the leveling wheel 7 is in contact with and presses against the aircraft fuselage, the aircraft fuselage has a reaction force against the leveling wheel 7, and the reaction force makes the leveling wheel 7 and the leveling wheel seat 71 to rotate counterclockwise about a hinge shaft 7100 of the leveling wheel seat 71 and the mounting bar 33 at an angle, for example, by 5°, the mating member 74 triggers the second detection switch 73. The second detection switch 73 may be a contact type detection switch. At this time, the second detection switch 73 may be triggered when it is in contact with the mating member 74. The second detection switch 73 may also be a proximity type detection switch such as a stroke switch. The second detection switch 73 may be triggered when approaching the mating member 74. The signal triggered by the second detection switch 73 may be transmitted to a control room of the passenger boarding bridge leveling mechanism under the control of a controller, and the operator of the passenger boarding bridge leveling mechanism can obtain that the leveling wheel 7 has contacted and pressed against the aircraft fuselage, wherein the controller may be a PLC controller. In this embodiment, an angle at which the leveling wheel seat 71 rotates counterclockwise about the hinge shaft 7100 of the leveling wheel seat 71 and the mounting bar 33 is not limited to 5°, and generally the angle is feasible in the range of 3°-10°.

Figure 8:
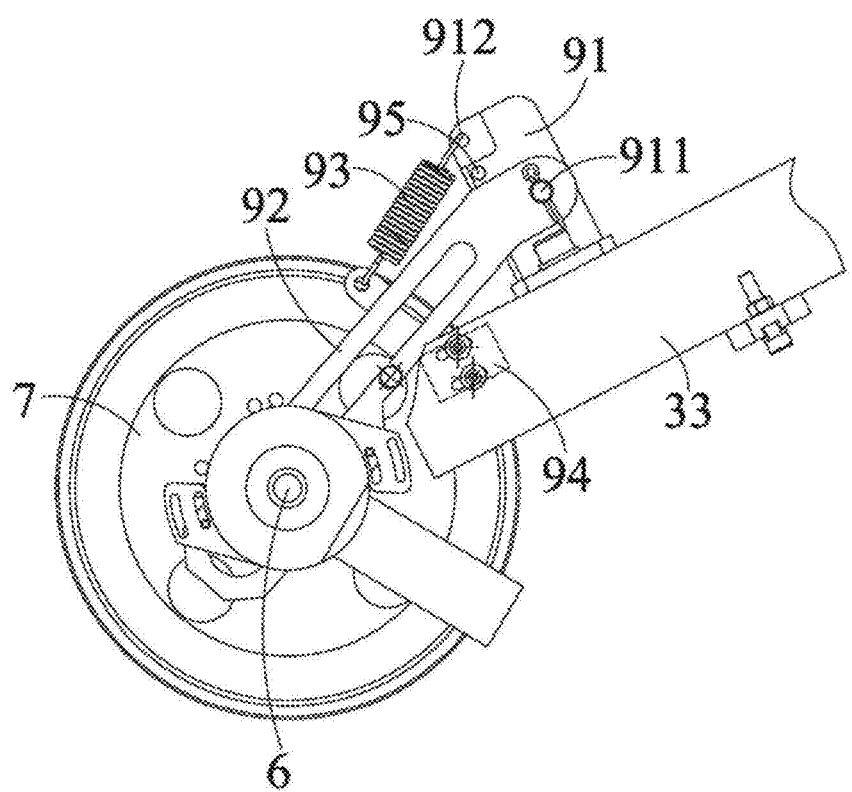
FIG. 8 shows a K-direction view of FIG. 6B, showing another structure of detection assembly.

Referring to FIG. 6B and FIG. 8, FIG. 8 shows a K-direction view of FIG. 6B, showing another structure of detection assembly. The passenger boarding bridge leveling mechanism of this embodiment further includes a support 91, a bracket 92, and a tension spring 93.

The support 91 is fixed above the end of the mounting bar 33, the support 91 has a certain height; one end of the bracket 92 is mounted with the leveling wheel 7, the other end thereof is rotatably connected to the support 91 by a shaft pin shaft 911 or the like; one end of the tension spring 93 is connected to the bracket 92, and the other end thereof is connected to the support 91. For example, the other end of the tension spring 93 is hooked inside a hole 912 of the support 91, which hole 912 is located above the pin shaft 911, and the tension spring 93 is located above the bracket 92.

In the passenger boarding bridge leveling mechanism of this embodiment, the detection assembly includes a second detection switch 94 mounted on the end of the mounting bar 33.

When the leveling wheel 7 is in contact with and presses against the aircraft fuselage, a reaction force of the aircraft fuselage against the leveling wheel 7 enables the leveling wheel 7 to rotate counterclockwise around the hinge point of the bracket 92 and the support 91 together with the bracket 92 by an angle of, for example, 6°, the bracket 92 triggers the second detection switch 94, and the second detection switch 94 sends a trigger signal. Generally, the angle at which the bracket 92 rotates counterclockwise about the hinge point of the bracket 92 and the support 91 is feasible in the range of 5° to 10°. Similar to the second detection switch 73 shown in FIG. 7A, the second detection switch 94 in this embodiment may be a contact type detection switch or a proximity type detection switch.

Further, in the embodiment, the detection assembly may further include a limiting member 95 such as a limiting pin or a limiting screw. The limiting member 95 is mounted on the support 91. The limiting member 95 may be mounted at a position between the pin shaft 911 and the hole 912, and the limiting member 95 may be closer to the bracket 92.

Of course, those skilled in the art should understand that the limiting member 95 in the detection assembly is not limited to the limiting pin or the limiting screw, and the mounting position of the limiting member 95 is not limited to be above the support 91 as long as limiting mechanisms in which the bracket 92 may be blocked from rotating clockwise are suitable for the present disclosure.

Referring to FIG. 5B, there is shown another configuration of a detection assembly in the passenger boarding bridge leveling mechanism of the present disclosure. As shown in FIG. 5B, the detection assembly of this embodiment is suitable for use in the case where the passenger boarding bridge leveling mechanism is provided with the drawbar 34. A recess 341 may be disposed on the drawbar 34. The detection assembly of this embodiment includes a second detection switch 90 which is mounted at a position of the lower end of the driving bar 31 corresponds to the recess 341. The second detection switch 90 may be a contact type switch or a proximity type switch. The leveling wheel 7 is not in contact with the aircraft fuselage when the second detection switch 90 is in contact with or approaches the recess 341, and the second detection switch is triggered to send a trigger signal when the second detection switch 90 moves away from the recess 341.

Further, as described in the description of the conversion process between the opened state and the retracted state of the previous passenger boarding bridge leveling mechanism, the stowage of the passenger boarding bridge leveling mechanism is completed by the drive device 41 driving the lower end of the driving bar 31. Referring to FIG. 5B, taking the drive device 41 being an air cylinder or an oil cylinder as an example, a length of the piston rod extending out of a cylinder body has a certain influence on whether the leveling wheel 7 may be in contact with the aircraft, for example, when the length of the piston rod extending out of the cylinder is too long, the rotation of the driving bar 31 is restricted, i.e., the outward movement of the leveling wheel 7 is limited. In this case, even if the detection result of the detection assembly is that the leveling wheel 7 is not in contact with the aircraft fuselage, the leveling wheel 7 cannot continue to extend outwards to contact the aircraft. In the present disclosure, the solution with respect to this problem is to provide a third detection switch 75 on the drive device 41 for detecting the shortest length of the drive device 41. When the drive device 41 is an air cylinder or an oil cylinder, the third detection switch 75 (see FIG. 5B) detects that an extreme position to which the piston rod could extend in the cylinder body, and when the piston rod extends to the extreme position in the cylinder, the third detection switch 75 is triggered to send a trigger signal.

In the passenger boarding bridge leveling mechanism of the present disclosure, when the controller receives the trigger signal of the third detection switch 75 and does not receive the trigger signal of the second detection switch of the contact aircraft detecting component, it means that the distance from the front end of the passenger boarding bridge to the aircraft fuselage is too far. At this time, the controller will send a prompt signal, and the operator can control the passenger boarding bridge to further extend a certain distance towards the aircraft according to the prompt signal; or the controller directly controls the passenger boarding bridge to further extend a certain distance towards the aircraft according to the prompt signal.

The passenger boarding bridge of the present disclosure comprises a telescopic body and at least one passenger boarding bridge leveling mechanism mounted on the front end of the telescopic body and one passenger boarding bridge leveling mechanism may usually be mounted on each of both sides of the front end of the telescopic body. The passenger boarding bridge leveling mechanism is the passenger boarding bridge leveling mechanism previously described in the present disclosure.

The passenger boarding bridge leveling mechanism of the present disclosure comprises a four-bar linkage mechanism and a preload apparatus, a leveling wheel and a first detection switch being mounted on one bar of the four-bar linkage mechanism, and retracted and opened states of the passenger boarding bridge leveling mechanism correspond to retracted and opened states of the four-bar linkage mechanism. Since the four-bar linkage mechanism is not prone to jamming during the process of retracting or opening, movement of the leveling wheel is smooth; simultaneously, the preload apparatus having a preload force makes the leveling wheel maintain a tendency of extending outwards. When the leveling wheel is in contact with the aircraft fuselage, it presses against the aircraft with a certain pressure, so that the leveling wheel can reliably contact the aircraft fuselage. The extension process of the passenger boarding bridge corresponds to conversion process of the passenger boarding bridge leveling mechanism between a retracted state and an opened state thereof; the conversion process of the passenger boarding bridge leveling mechanism between the retracted state and the opened state thereof corresponds to convention process of the four-bar linkage mechanism between a retracted state and an opened state thereof, so that in the conversion process of the passenger boarding bridge leveling mechanism between the retracted state and the opened state thereof, a movement trajectory of a center of the leveling wheel mounted on the four-bar linkage mechanism may be approximately linear, and with respect to the aircraft fuselage, the approximately linear movement trajectory of leveling wheel is characterized by a larger displacement in a horizontal direction and a smaller variation of a displacement in a vertical direction. Therefore, the use of the passenger boarding bridge leveling mechanism of the present disclosure may effectively reduce the detection error of misjudging that the aircraft fuselage ascends or descends, caused by extension of the passenger boarding bridge.

Further, by precisely designing a length ratio of bars of the four-bar linkage mechanism, the approximately linear movement trajectory is slightly downward in the main working area of the leveling mechanism, so that the detection error caused by the angular change of bars for mounting the leveling wheel and the first detection switch with respect to the leveling wheel may offset some of the detection error of misjudging that the aircraft fuselage ascends or descends, caused by the extension of the passenger boarding bridge, which makes the detection more accurate.

INDUSTRIAL APPLICABILITY

The passenger boarding bridge leveling mechanism of the present disclosure is usually applied to a passenger boarding bridge for changing the movement trajectory of the leveling wheel during the extension process of the passenger boarding bridge by mounting the leveling wheel on a four-bar linkage mechanism, so that the movement trajectory of the leveling wheel is approximately linear. That is to say, the present disclosure reduces the vertical displacement of the leveling wheel during the extension process of the passenger boarding bridge by mounting the leveling wheel on the four-bar linkage mechanism. Therefore, by using the passenger boarding bridge leveling mechanism of the present disclosure, it is possible to effectively reduce the detection error of misjudging that the aircraft fuselage ascends or descends, caused by the extension of the passenger boarding bridge.

Relative terms such as "upper" or "lower" may be used in the above embodiments to describe the relative relationship of one component of an icon to another component. However, it should be understandable that if the device of the icon is turned upside down, the "upper" component described above will become the "lower" component. The terms "a", "an", "the", "said" and "at least one" are used to mean that there are one or more elements/components/etc.; the terms "include", "comprise", and "have" are used to represent an open type inclusion and to mean that there may be additional elements/components/etc. in addition to the listed elements/components/etc; the terms "first", "second" and "third" etc. are used only as markers, without limitation of the number of objects.

It should be understood that the present disclosure does not limit its application to the detailed structure and arrangement of the components presented in the specification. The present disclosure is capable of having other embodiments, and may be implemented and performed in various manners. The foregoing variations and modifications are intended to fall within the scope of the present disclosure. It should be understood understandable that the present disclosure disclosed and claimed herein extends to all alternative combinations of two or more individual features that are mentioned or apparent in the drawings or the contexts. All of these different combinations constitute a plurality of alternative aspects of the present disclosure. The embodiments described in the specification are illustrative of the best mode of the present disclosure, and will enable those skilled in the art to implement the present disclosure.

Although the present disclosure has been described with reference to the exemplary embodiments, it should be understandable that the used terms are intended to be illustrative and exemplary, which are not restrictive. The present disclosure may be embodied in a variety of forms without departing from the spirit or scope of the present disclosure, thus it should be understandable that the above-described embodiments are not limited to any of the details above and should be interpreted broadly within the spirit and scope of the appended claims. All changes and modifications falling within the scope of the claims or the equivalents thereof are intended to be covered by the appended claims.

What is claimed is:

1. A passenger boarding bridge leveling mechanism mounted on a passenger boarding bridge, wherein the passenger boarding bridge leveling mechanism comprises:
    a four-bar linkage mechanism comprising a mounting base and three bars, in which the mounting base may be fixedly mounted on the passenger boarding bridge; in which one of the three bars extends outwards, and a leveling wheel and a first detection switch are mounted at an end of the outwardly extending bar, the first detection switch being used for detecting a vertical displacement of the leveling wheel on an aircraft fuselage;
    a preload apparatus having an end connected to the mounting base, and the other end connected to one of the three bars, the preload apparatus further comprising a preload to make the outwardly extending bar maintain a tendency of extending outwards.

2. The passenger boarding bridge leveling mechanism according to claim 1, wherein the three bars of the four-bar linkage mechanism comprise:
    a driving bar, a lower portion of which is hinged to the mounting base;
    a driven bar, a lower end of which is hinged to the mounting base, the driven bar being located above the driving bar;
    a mounting bar, one end of which is hinged to an upper end of the driven bar, the other end of which extends outwards and is mounted with the leveling wheel and the first detection switch;
    an upper end of the driving bar being hinged to the mounting bar.

3. The passenger boarding bridge leveling mechanism according to claim 2, wherein the preload apparatus is a tension spring, one end of which is connected to a lower end of the driving bar, and the other end of which is connected to the mounting base.

4. The passenger boarding bridge leveling mechanism according to claim 2, wherein a hinge position of the upper end of the driving bar and the mounting bar is adjacent to a hinge point of the mounting bar and the driven bar.

5. The passenger boarding bridge leveling mechanism according to claim 2, wherein a side surface of the driving bar facing the mounting bar is an inclined surface, and the inclined surface is capable of being attached to the mounting bar in a state in which the passenger boarding bridge leveling mechanism is retracted.

6. The passenger boarding bridge leveling mechanism according to claim 2, wherein a length ratio of the driving bar, the driven bar and the mounting bar is (1.1~1.3):(0.9~1.1):(1.1~1.3).

7. The passenger boarding bridge leveling mechanism according to claim 2, wherein the driving bar and/or the driven bar and/or the mounting bar are hollow and tubular.

8. The passenger boarding bridge leveling mechanism of claim 2, further comprising:
    a drive device mounted on the mounting base for driving the mounting bar to extend outwards or retract.

9. The passenger boarding bridge leveling mechanism according to claim 8, wherein the mounting base has an inclined plate portion, a hollow portion and an opening, and the driven bar and the driving bar are respectively hinged to upper and lower ends of the inclined plate portion.

10. The passenger boarding bridge leveling mechanism according to claim 9, wherein the lower end of the driving bar extends into a hollow portion from an opening of the mounting base, and the drive device is mounted on the hollow portion and may drive the lower portion of the driving bar to rotate the driving bar about the hinge point where the driving bar and the mounting base are hinged.

11. The passenger boarding bridge leveling mechanism according to claim 10, wherein the passenger boarding bridge leveling mechanism further comprises:
    a drawbar, one end of which is connected to the lower portion of the driving bar and the other end of which is connected to the drive device.

12. The passenger boarding bridge leveling mechanism according to claim 11, wherein said passenger boarding bridge leveling mechanism further comprises a detection assembly for detecting whether the leveling wheel is in contact with the aircraft fuselage, the drawbar has a recess, the detection assembly comprises a second detection switch mounted at a position of the lower end of the driving bar corresponding to the recess, the leveling wheel is not in contact with the aircraft fuselage when the second detection switch contacts or approaches the recess, and the second detection switch is triggered to send a trigger signal when the second detection switch moves away from the recess.

13. The passenger boarding bridge leveling mechanism according to claim 1, wherein the passenger boarding bridge leveling mechanism further comprises a housing assembly in which the passenger boarding bridge leveling mechanism may be accommodated when the passenger boarding bridge leveling mechanism is in the retracted condition.

14. The passenger boarding bridge leveling mechanism according to claim 13, wherein the housing assembly comprises:
a fixed housing body fixed to the mounting base and having an accommodation space and an opening;
a left opening door, one side of which is hinged to one side of the opening of the fixed housing body;
a right opening door, one side of which is hinged to the other side of the opening of the fixed housing body, the left and right opening doors may close the opening in a closed state.

15. The passenger boarding bridge leveling mechanism according to claim 14, wherein the housing assembly further comprises:
at least two torsion springs respectively disposed at a connection between the left and right opening doors and the fixed housing body, a torsion force of the torsion spring making the left opening door and the right opening door maintain a tendency of opening;
at least two limiting members respectively configured to limit a maximum angle at which the left opening door and the right opening door may be opened;
a door opening mechanism configured to automatically open or close the left and right opening doors.

16. The passenger boarding bridge leveling mechanism according to claim 15, wherein the door opening mechanism comprises:
a limiting bar fixed to the mounting bar, and both ends of the limiting bar extending out of the mounting bar;
two limiting plates respectively fixed at inside of the left opening door and the right opening door, and each of the limiting plates has a limiting portion protruding inwards;
both ends of the limiting bar respectively cooperates with two limiting portions to complete opening and closing of the left and right opening doors.

17. The passenger boarding bridge leveling mechanism according to claim 16, wherein each of both ends of the limiting bar is respectively mounted with a collision block, and two collision blocks press both ends of the limiting bar to complete opening and closing of the left opening door and the right opening door respectively.

18. The passenger boarding bridge leveling mechanism according to claim 16, wherein the limiting portion is provided with a through hole, the fixed housing body is provided with a fixing piece corresponding to a position of the limiting plate, the fixing piece is provided with a through hole, the limiting member is a bar member which passes through the through hole on the limiting portion and the through hole on the fixing piece, and a limiting cap is provided on a top end of the bar member.

19. The passenger boarding bridge leveling mechanism according to claim 16, wherein the limiting portion is provided with a through hole, an opening of the fixed housing body is provided with a flange, the flange is provided with a through hole, the limiting member is a bar which passes through the through hole on the limiting portion and the through hole on the flange, and a limiting cap is provided on a top end of the bar member.

20. The passenger boarding bridge leveling mechanism according to claim 1, wherein the passenger boarding bridge leveling mechanism further comprises:
a detection assembly configured to detect whether the leveling wheel is in contact with the aircraft fuselage.

21. The passenger boarding bridge leveling mechanism according to claim 20, wherein the passenger boarding bridge leveling mechanism further comprises:
a support fixed to an end of the mounting bar;
a bracket, one end of which is mounted with the leveling wheel, and the other end of which is rotatably connected to the support;
a tension spring connected between the bracket and the support;
in which the detection assembly comprises a second detection switch mounted on an end of the mounting bar, the tension spring is configured so that the second detection switch is not triggered when the leveling wheel is not in contact with the aircraft fuselage, and a reaction force of the aircraft fuselage against the leveling wheel may rotate the bracket around the hinge point of the bracket and the support at an angle when the leveling wheel is in contact with and presses against the aircraft fuselage, the bracket triggers the second detection switch, and the second detection switch sends a trigger signal.

22. The passenger boarding bridge leveling mechanism according to claim 21, wherein the angle at which the bracket rotates around the hinge point of the bracket and the support ranges from 5° to 10°.

23. The passenger boarding bridge leveling mechanism according to claim 21, wherein the detection assembly further comprises:
a limiting member mounted on the support and located above the bracket for limiting a clockwise rotation of the bracket under an action of the tension spring.

24. The passenger boarding bridge leveling mechanism according to claim 20, wherein the passenger boarding bridge leveling mechanism further comprises:
a leveling wheel seat, in which the leveling wheel is mounted on the leveling wheel seat, the leveling wheel seat has an upper side and a lower side opposite to each other, the mounting bar has an upper side and a lower side opposite to each other, and the upper side of the leveling wheel seat is hingedly connected to the upper side of the mounting bar by a hinge, and a compression spring is mounted between the lower side of the leveling wheel seat and the lower side of the mounting bar;
in which the detection assembly comprises a second detection switch mounted on the leveling wheel seat and a mating member mounted on the mounting bar, the tension spring is configured so that the second detection switch is not triggered when the leveling wheel is not in contact with the aircraft fuselage, and a reaction force of the aircraft fuselage against the leveling wheel may rotate the leveling wheel seat around a hinge shaft of the leveling wheel seat by an angle when the leveling wheel is in contact with and presses against the aircraft fuselage, the mating member triggers the second detection switch, and the second detection switch sends a trigger signal.

25. The passenger boarding bridge leveling mechanism according to claim 20, wherein a length of the drive device is extendable, the drive device drives the driving bar to rotate by extension of its length, the detection assembly further comprises:

a third detection switch mounted on the drive device and triggered to send a trigger signal when the drive device is shortened to the shortest length.

26. A passenger boarding bridge comprising a telescopic body, wherein a front end is mounted with at least one passenger boarding bridge leveling mechanism, wherein the passenger boarding bridge leveling mechanism comprises:

a four-bar linkage mechanism comprising a mounting base and three bars, in which the mounting base may be fixedly mounted on the passenger boarding bridge; in which one of the three bars extends outwards, and a leveling wheel and a first detection switch are mounted at an end of the outwardly extending bar, the first detection switch being used for detecting a vertical displacement of the leveling wheel on an aircraft fuselage;

a preload apparatus having an end connected to the mounting base, and the other end connected to one of the three bars, the preload apparatus further comprising a preload to make the outwardly extending bar maintain a tendency of extending outwards.

* * * * *